(12) United States Patent
Mudireddy et al.

(10) Patent No.: US 10,728,159 B2
(45) Date of Patent: Jul. 28, 2020

(54) PRIORITIZATION FOR A PACKET COMMUNICATION PROTOCOL WITH HEADER COMPRESSION

(71) Applicant: QUALCOMM Incorporated, San Diego, CA (US)

(72) Inventors: Srinivas Reddy Mudireddy, San Diego, CA (US); Shailesh Maheshwari, San Diego, CA (US); Vinay Paradkar, Broomfield, CO (US); Gang Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/359,688

(22) Filed: Mar. 20, 2019

(65) Prior Publication Data
US 2019/0297019 A1 Sep. 26, 2019

Related U.S. Application Data

(60) Provisional application No. 62/648,306, filed on Mar. 26, 2018.

(51) Int. Cl.
*H04L 1/16* (2006.01)
*H04L 12/801* (2013.01)
(Continued)

(52) U.S. Cl.
CPC ........ *H04L 47/2466* (2013.01); *H04L 1/1664* (2013.01); *H04L 1/1671* (2013.01);
(Continued)

(58) Field of Classification Search
CPC ....... H04L 1/12–20; H04L 47/10–6295; H04L 69/02–40; H04W 24/02–10;
(Continued)

(56) References Cited

U.S. PATENT DOCUMENTS

| | | |
|---|---|---|
| 2003/0206534 A1 | 11/2003 | Wu |
| 2004/0071096 A1 | 4/2004 | Na et al. |
| 2015/0215218 A1 | 7/2015 | Kanamarlapudi et al. |

OTHER PUBLICATIONS

Carsten Borman (ED) et al: "RObust Header Compression (ROHC): Framework and Four Profiles: RTP, UDP, ESP, and Uncompressed; draft-ietf-rohc-rtp-09.txt", Robust Header Compression (ROHC): Framework and Four Profiles: RTP, UDP, ESP, and Uncompressed; Draft-IETF-ROHC-RTP-09.TXT, Internet Engineering Task Force, IETF; Standardworkingdraft, Internet Society (ISOC) 4, Rue Des Falaises CH—1205 Geneva, SWIT, vol. rohc, No. 9, Feb. 26, 2001, XP015026703, 154 pages, paragraph [5.1.3] paragraph [5.2.2].

(Continued)

*Primary Examiner* — Timothy J Weidner
(74) *Attorney, Agent, or Firm* — Qualcomm Incorporated

(57) ABSTRACT

When sending a first set of packets is determined to be prioritized over sending a second set of packets, and when each first header of each of the first set of packets and each second header of each of the second set of packets is determined to be compressed, an apparatus may compress the first header of each of the first set of packets using a first CID associated with a connection. Further, the apparatus may compress the second header of each of the second set of packets using a second CID associated with the connection. The apparatus may send the first set of packets through the connection. The apparatus may send, after sending the first set of packets, the second set of packets through the connection.

30 Claims, 12 Drawing Sheets

(51) Int. Cl.

| | |
|---|---|
| *H04L 12/825* | (2013.01) |
| *H04L 12/851* | (2013.01) |
| *H04L 12/865* | (2013.01) |
| *H04L 29/06* | (2006.01) |
| *H04W 28/02* | (2009.01) |
| *H04W 28/06* | (2009.01) |
| *H04W 28/08* | (2009.01) |
| *H04W 72/10* | (2009.01) |
| *H04W 76/11* | (2018.01) |
| *H04W 80/06* | (2009.01) |
| *H04L 12/855* | (2013.01) |

(52) U.S. Cl.
CPC ............ *H04L 47/14* (2013.01); *H04L 47/193* (2013.01); *H04L 47/2433* (2013.01); *H04L 47/26* (2013.01); *H04L 47/35* (2013.01); *H04L 47/6275* (2013.01); *H04L 69/04* (2013.01); *H04L 69/22* (2013.01); *H04W 28/0273* (2013.01); *H04W 28/06* (2013.01); *H04W 28/08* (2013.01); *H04W 72/10* (2013.01); *H04W 76/11* (2018.02); *H04W 80/06* (2013.01)

(58) Field of Classification Search
CPC ..... H04W 28/02–14; H04W 40/24–32; H04W 72/005–14; H04W 76/10–25; H04W 80/02–06
See application file for complete search history.

(56) References Cited

OTHER PUBLICATIONS

International Search Report and Written Opinion—PCT/US2019/023430—ISA/EPO—dated May 16, 2019.
Ipwireless: "Benefits of IP-aware Scheduling," 3GPP Draft; S2-070759-IP_AWARE_SCHEDULING, 3RD Generation Partnership Project (3GPP), Mobile Competence Centre; 650, Route Des Lucioles; F-06921 Sophia-Antipolis Cedex; France, vol. SA WG2, No. St Louis, Missouri, USA; 20070207, Feb. 7, 2007, XP050258022, 6 pages, [retrieved on Feb. 7, 2007] figure 3 p. 3, line 1-line 4 p. 2; figure 1.2.1 p. 3, line 9-line 20 p. 6, line 10.
LG Electronics Inc: "Prioritizing TCP ACK Transmission," 3GPP Draft; R2-1703514 Prioritizing TCP ACK Transmission, 3RD Generation Partnership Project (3GPP), Mobile Competence Centre; 650, Route Des Lucioles; F-06921 Sophia-Antipolis Cedex; France, vol. RAN WG2, No. Spokane, USA; 20170403-20170407, Mar. 24, 2017, XP051253977, 3 Pages, Retrieved from the Internet: URL: http://www.3gpp.org/ftp/tsg_ran/WG2_RL2/TSGR2_97bis/Docs/ [retrieved on Mar. 24, 2017] paragraph [0002] figure 1.

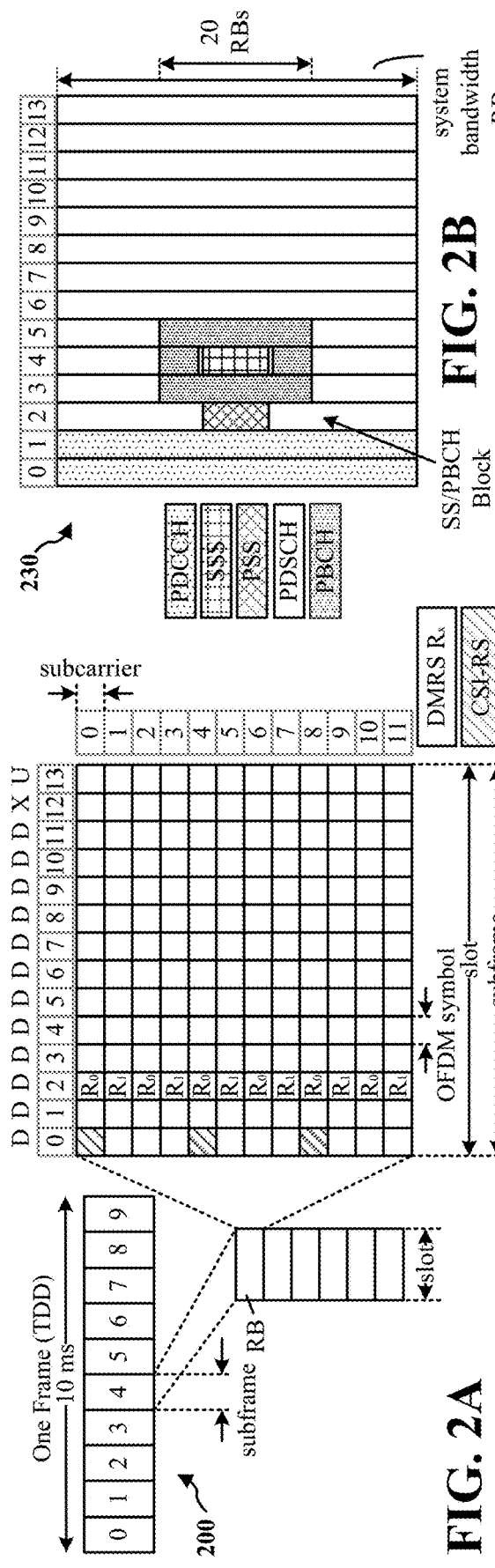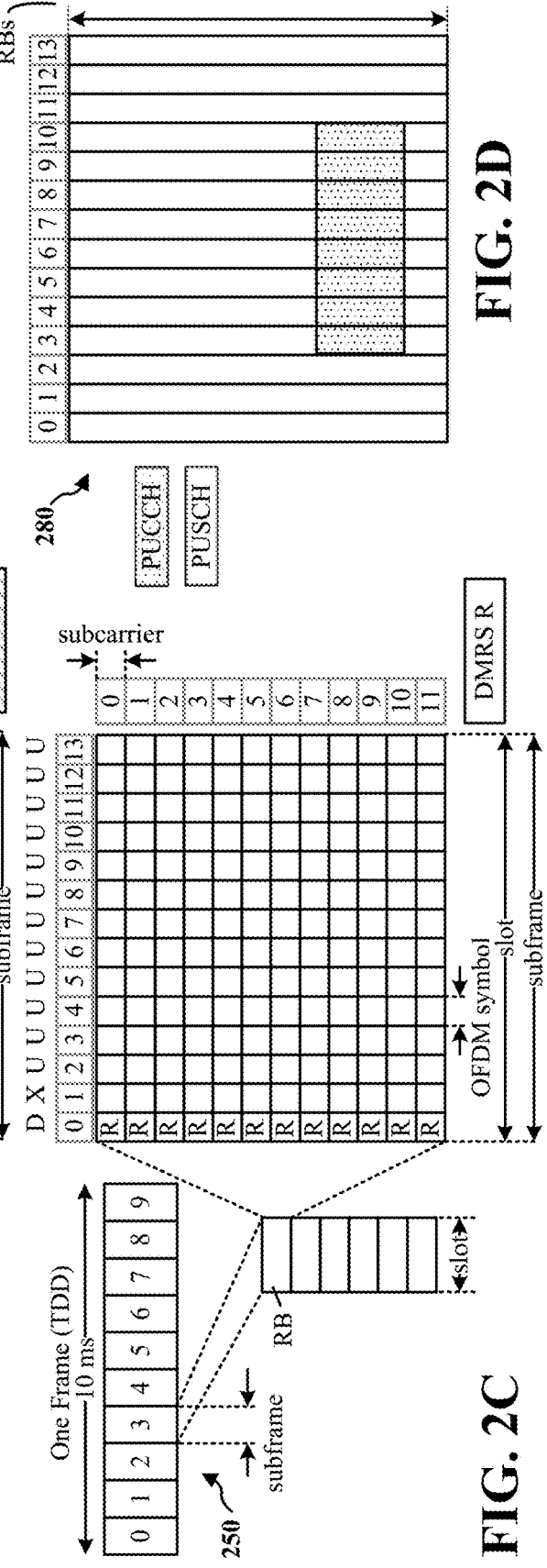

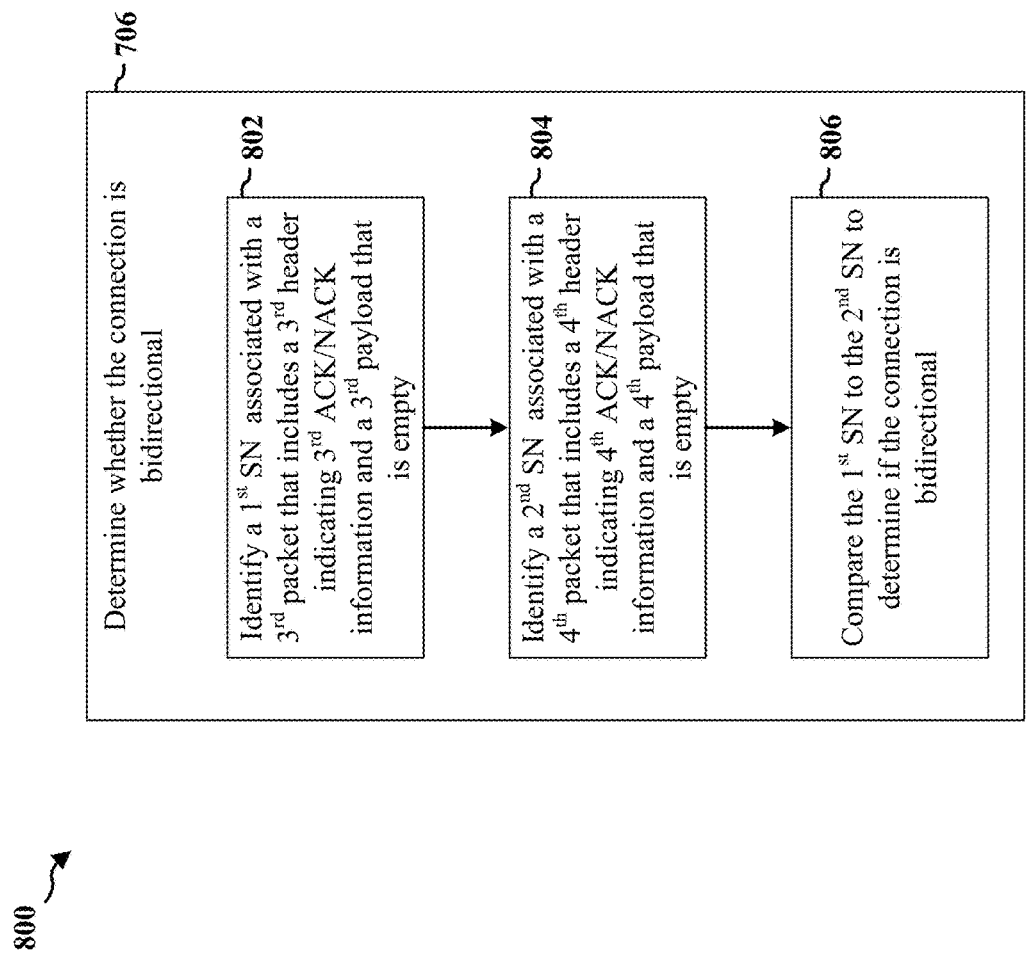

PRIORITIZATION FOR A PACKET COMMUNICATION PROTOCOL WITH HEADER COMPRESSION

CROSS REFERENCE TO RELATED APPLICATION(S)

This application claims the benefit of U.S. Provisional Application Ser. No. 62/648,306, entitled "TRANSPORT CONTROL PROTOCOL ACKNOWLEDGEMENT PRIORITIZATION WITH COMPRESSION" and filed on Mar. 26, 2018 which is expressly incorporated by reference herein in its entirety.

BACKGROUND

Technical Field

The present disclosure relates generally to communication systems, and more particularly, to prioritization of acknowledgement and/or negative acknowledgement information with compression of packet headers.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various wireless communications systems may be configured to connections according to a packet communication protocol, such as Transport Control Protocol (TCP). For example, a first peer device may establish a packet communication protocol connection with a second peer device, and the packet communication protocol connection may be mapped to a source port (e.g., of the first peer) and a destination port (e.g., of the second peer).

In some instances, a packet communication protocol connection established between the first peer device and the second peer device may be bidirectional. A bidirectional connection may be configured to carry data from the first peer device to the second peer device and to carry data from the second peer device to the first peer device. A bidirectional connection may differ from a unidirectional connection in that data is carried both to and from the first peer device and the second peer device, whereas a unidirectional connection may carry data in one direction (e.g., from the second peer device to the first peer device) and carry acknowledgement (ACK) information in the other direction (e.g., from the first peer device to the second peer device).

According to various configurations, ACK information may be included in packets having data in payloads. For example, ACK/NCK information may be "piggybacked" in packets, whereas packets having empty payloads but including ACK information may be "pure" ACK packets. The pure ACK packets may be prioritized, which may cause packets to be delivered out of order.

Out-of-order delivery may cause various issues, in particular with respect to compression. For example, a header compression protocol may call for compression of a header of one packet based on a difference between the header of the one packet and a header of a previous packet. An example of such a header compression protocol may be Robust Header Compression (ROHC). Correspondingly, the header compression protocol for decompression may call for decompression of the header of the one packet based on the difference between the header of the one packet and the header of the previous packet. Consequently, prioritizing pure ACK packets over piggybacked ACK packets (or vice versa) may cause out-of-order delivery of header-compressed packets, which may cause a decompressor of a receiver to lose synchronization context with a compressor of a transmitter. The present disclosure may address the out-of-order delivery of header-compressed packets when prioritizing a first set of packets (e.g., "pure" ACK packets) over a second set of packets (e.g., piggybacked ACK packets) when communicating over a bidirectional connection.

In an aspect of the disclosure, a method, a computer-readable medium, and an apparatus are provided. The apparatus may determine whether to prioritize sending a first set of packets over sending a second set of packets through a connection established with a second apparatus, each of the first set of packets having a first header indicating first ACK information and a first payload that is empty and each of the second set of packets having a second header indicating second ACK information and a second payload including data. The apparatus may determine whether to compress each first header of each of the first set of packets and each second header of each of the second set of packets. When the sending the first set of packets is determined to be prioritized over the sending the second set of packets, and when each first header of each of the first set of packets and each second header of each of the second set of packets is determined to be compressed, the apparatus may compress the first header of each of the first set of packets using a first context identifier (CID) associated with the connection. Further, the apparatus may compress the second header of each of the second set of packets using a second CID associated with the connection. Further, the apparatus may send the first set of packets through the connection, each of the first set of packets indicating the first CID. Further, the apparatus may send, after the sending the first set of packets, the second set of packets through the connection, each of the second set of packets indicating the second CID.

According to one aspect, the apparatus further may, when the sending of the first set of packets is determined not to be prioritized over the sending the second set of packets, and when each first header of each of the first set of packets and each second header of each of the second set of packets is determined to be compressed, compress each first header of each of the first set of packets and each second header of each of the second set of packets using the second CID, and send, in order, each of the first set of packets and each of the second set of packets through the connection, each of the first set of packets and second set of packets indicating the second CID.

In one aspect, the apparatus further may, when the sending the first set of packets is determined to be prioritized over the sending the second set of packets and when each first header of each of the first set of packets and each second header of each of the second set of packets is determined to be uncompressed, refrain from compressing each first header of each of the first set of packets and each second header of each of the second set of packets, send each of the first set of packets to the second apparatus through the connection, and send, after sending each of the first set of packets, each of the second set of packets to the second apparatus through the connection.

In one aspect, the apparatus further may determine whether the connection is bidirectional, and the determination of whether to prioritize sending the first set of packets over sending the second set of packets through the connection established with the second apparatus is based on the connection being determined to be bidirectional. In one aspect, determination of whether the connection is bidirectional may include identification of a first sequence number associated with a third packet that includes a third header indicating third ACK information and includes a third payload that is empty, identification of a second sequence number associated with a fourth packet that includes a fourth header indicating fourth ACK information and includes a fourth payload that is empty, and comparison of the first sequence number to the second sequence number, and the connection is determined to be bidirectional when the first sequence number is different from the second sequence number.

In one aspect, the apparatus may further establish the first CID associated with the connection when the sending the first set of packets is determined to be prioritized over the sending the second set of packets and when each first header of each of the first set of packets and each second header of each of the second set of packets is determined to be compressed. In one aspect, the first CID is established to be mapped to a same source address, a same destination address, a same source port, and a same destination port of the connection to which the second CID is mapped.

In one aspect, the aparats further may, when the sending the first set of packets is determined to be prioritized over the sending the second set of packets, inspect each payload of each of an obtained set of packets for data, add, to the first set of packets, each of the obtained set of packets having a payload that is empty, and add, to the second set of packets, each of the obtained set of packets having a payload including data.

In one aspect, the apparatus further may establish the connection with the second apparatus, and receive, through the connection, downlink data from the second apparatus, and the first ACK information and the second ACK information is based on the downlink data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 8 is a flowchart illustrating an example of a method of wireless communication.

DETAILED DESCRIPTION

Figure 1:
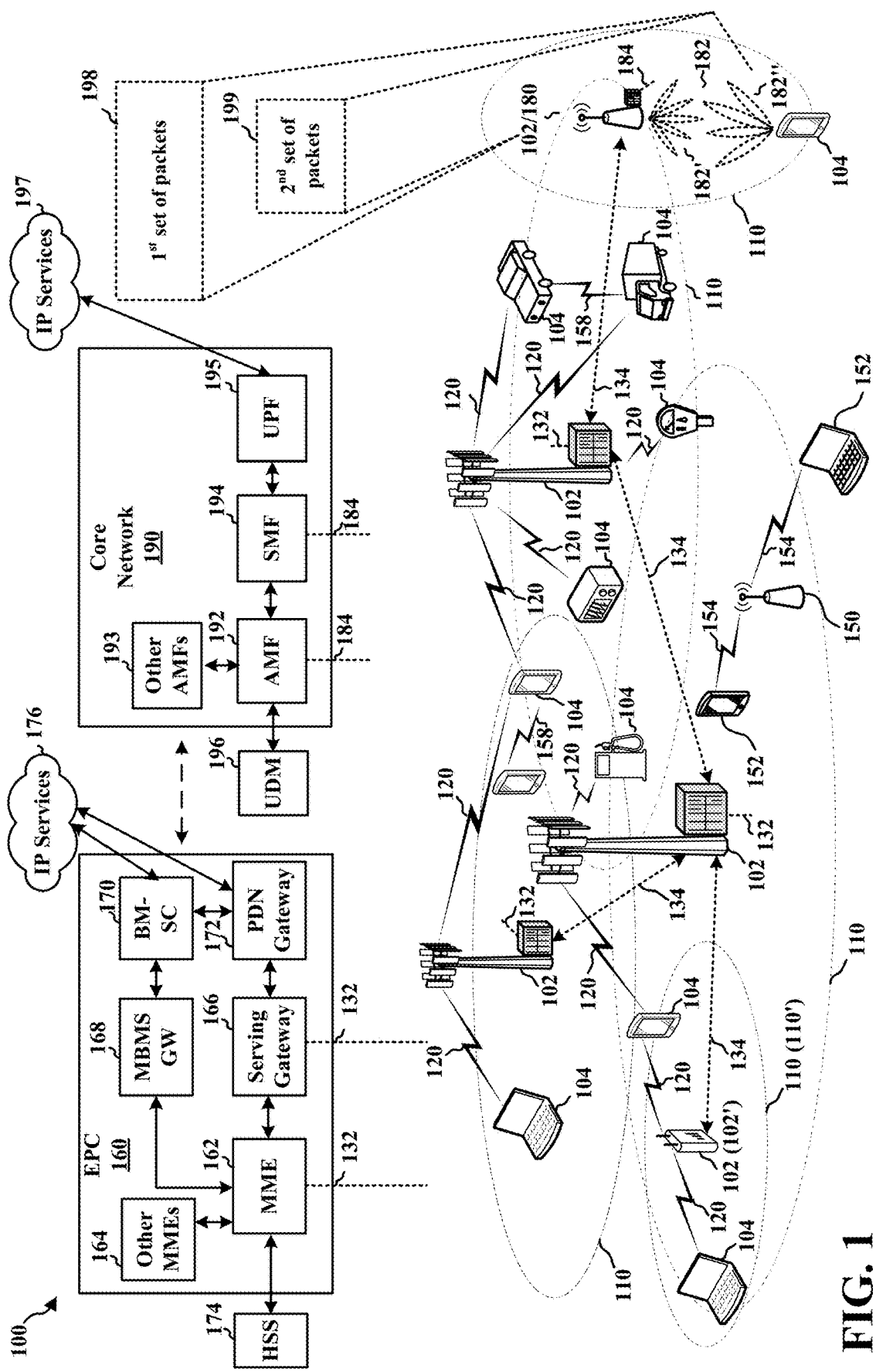
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may refer to a Transport Control Protocol (TCP), 5G New Radio (NR) and/or LTE, the concepts described herein may be applicable other similar areas, such as LTE-A, Code Division Multiple Access (CDMA), Global System for Mobile (GSM) communications, and/or other wireless/radio access technologies/protocols. Referring again to FIG. 1, in certain aspects, the UE 104 may be configured to determine whether to prioritize sending a first set of packets 198 over sending a second set of packets 198 through a connection established with the base station 102/180/180, each of the first set of packets 198 having a first header indicating first ACK information and a first payload that is empty and each of the second set of packets 199 having a second header indicating second ACK information and a second payload including data. The UE 104 may determine whether to compress, based on a header compression protocol, each first header of each of the first set of packets 198 and each second header of each of the second set of packets 199. An example of a header compression protocol may include Robust Header Compression (ROHC). When the sending the first set of packets 198 is determined to be prioritized over the sending the second set of packets 199, and when each first header of each of the first set of packets 198 and each second header of each of the second set of packets 199 is determined to be compressed, the UE 104 may compress the first header of each of the first set of packets 198 based on the header compression protocol using a first context identifier (CID) associated with the connection. Further, the UE 104 may compress the second header of each of the second set of packets 199 based on the header compression protocol using a second CID associated with the connection. Further, the UE 104 may send the first set of packets 198 through the connection, each of the first set of packets 198 indicating the first CID. Further, the UE 104 may send, after the sending the first set of packets 198, the second set of packets 199 through the connection, each of the second set of packets indicating the second CID.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
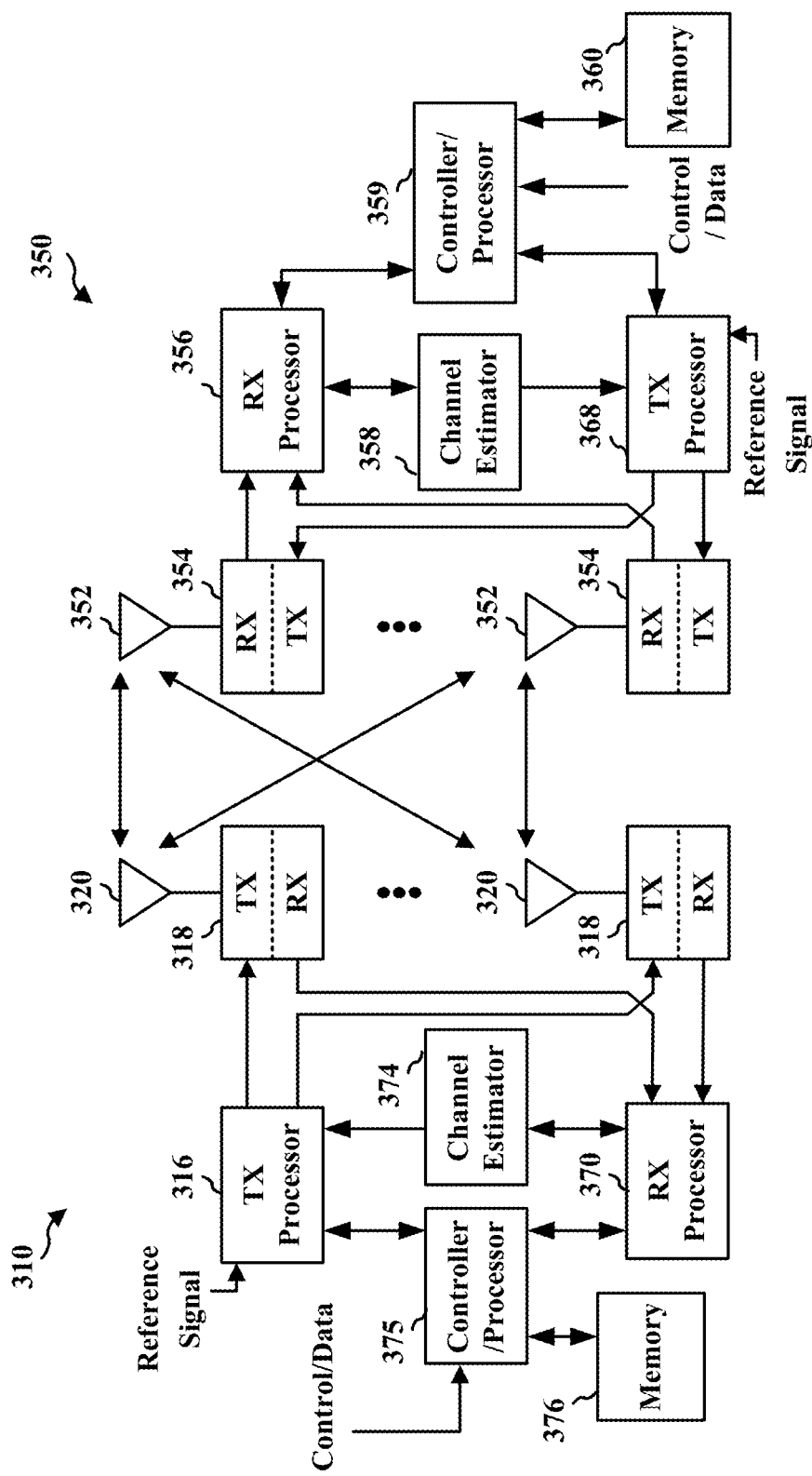
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

Figure 4:
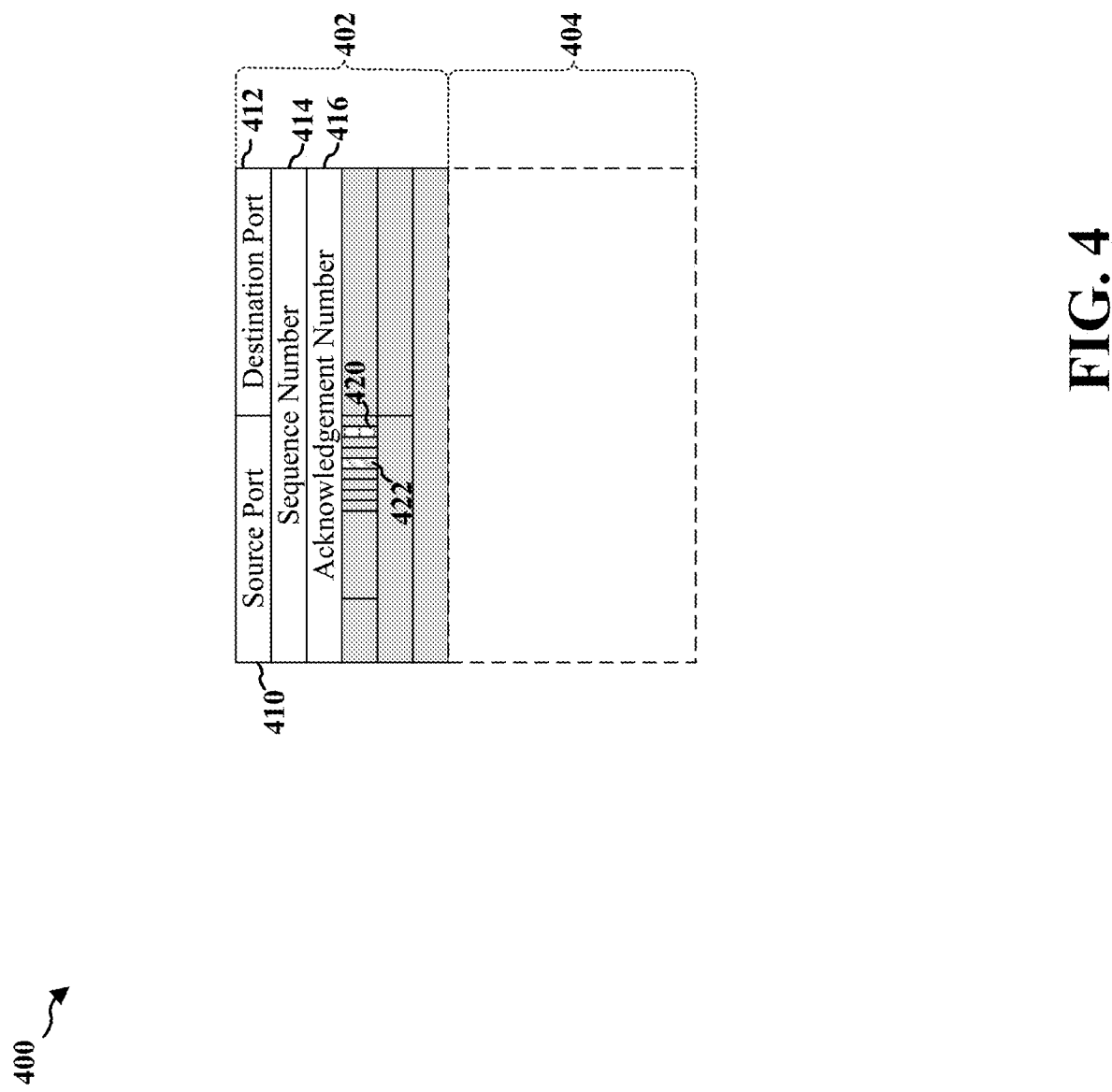
FIG. 4 is a diagram illustrating an example of a packet communication protocol packet.

FIG. 4 is a diagram of a packet 400, according to various aspects of the present disclosure. The packet 400 may of a packet communication protocol, such as TCP.

The packet 400 may include a header 402 and a payload 404. The header 402 may include a source port field 410. The source port field 410 may indicate a source port on a first peer device that initiates a connection. For example, the first peer device may dynamically allocate a source port when establishing a connection. The first peer device may indicate the source port in the source port field 410 in a packet 400 that has a synchronization (SYN) flag 420 set to indicate that the packet 400 is a SYN packet. Subsequent packets may also include the source port in the source port field 410 in order to at least partially indicate the connection for which the subsequent packets are intended.

The header 402 may further include a destination port field 412. The destination port field 412 may indicate a destination port at a second peer device, e.g., at which a service is available at the second peer device. The first peer device may obtain the destination port, and the first peer device may set the destination port in the destination port field 412. The first peer device may indicate the destination port in the destination port field 412 in a packet 400 that has a SYN flag 420 set to indicate that the packet 400 is a SYN packet. Subsequent packets may also include the destination port in the destination port field 412 in order to at least partially indicate the connection for which the subsequent packets are intended.

The header 402 may further include a sequence number (SN) field 414. When the packet 400 is a SYN packet (e.g., for connection initiation), the SN field 414 may be set to a number, which may be consistent with parameters of the packet communication protocol. The first SN may dynamically selected (e.g., randomly), and increased pursuant to data bytes that are sent through the connection. After connection establishment and during communication over the connection, the SN field 414 may indicate the accumulated data bytes (e.g., included in payloads) sent through the connection during a session (e.g., from the first peer device to the second peer device).

The header 402 may further include an ACK number field 416. The ACK number field 416 may indicate the data bytes acknowledged by the second peer device as received from the first peer device, and may indicate the next SN of the next data byte that the second peer device is expecting to receive from the first peer device. For example, the ACK number field 416 may indicate an SN of the last data byte acknowledged as received plus one (e.g., to indicate the SN of the next data byte expected to be received).

The header 402 may further include a SYN flag 420. The SYN flag 420 may be set by the first peer device (e.g., the device initiating the connection) to indicate that the packet 400 is a SYN packet associated with establishing a connection. For example, the SYN flag 420 may be set to "1." The SYN flag 420 may be set to indicate that SNs between the first peer device and the second peer device are to be synchronized. In aspects, the SYN flag 420 may be set in the SYN packet (e.g., for initiation of a connection), but may be cleared (e.g., set to "0") in subsequent packets sent through the connection.

The header 402 may further include an ACK flag 422. The ACK flag 422 may be set (e.g., to "1") in order to indicate that the ACK number 416 indicates ACK information. In various aspects, the ACK flag 422 is set by the sender (e.g., the first peer device) in each packet after a SYN packet in which the SYN flag 420 is set to indicate that the packet is a SYN packet.

The packet 400 may further include a payload 404. The payload 404 may carry data. In various aspects, the data carried in the payload 404 may correspond to the SN indicated in the SN field 414. For example, the SN field 414 may indicate the accumulated data bytes that have been carried through the connection, including the data bytes carried in the payload 404 (e.g., the SN of the previous packet plus the number of data bytes included in the payload 404).

Figure 5:
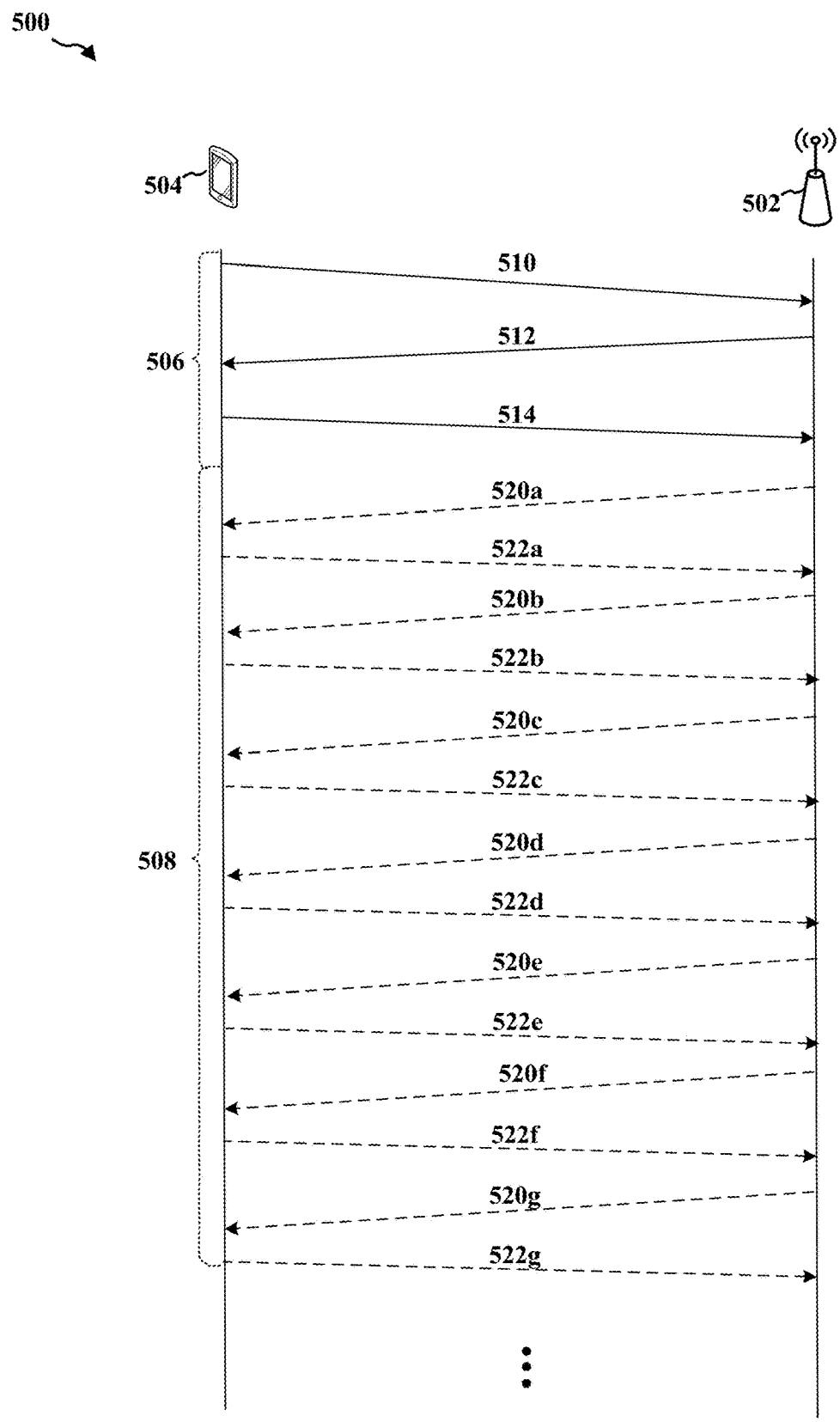
FIG. 5 is a call flow diagram illustrating an example of a communications session.

FIG. 5 illustrates a call flow diagram of a method 500 for communicating through a connection according to a packet communication protocol, such as TCP. The method 500 may be performed by a first peer device 504 and a second peer device 502.

The method 500 may include a connection establishment phase 506 and a data communication phase 508. Beginning first with the connection establishment phase 506, the first peer device 504 may generate and send a SYN packet 510 to the second peer device 502. In the context of FIG. 4, the first peer device 504 may set the SYN flag 420. The first peer device 504 may allocate a source port and may indicate the source port in the source port field 410. The first peer device 504 may obtain a destination port of the second peer device 502 at which a service requested by the first peer device 504 is available. The first peer device 504 may indicate the destination port in the destination port field 412. The first peer device 504 may select (e.g., randomly) a first SN and may set the SN field 414 to the first SN.

The second peer device 502 may be listening on the destination port, and may receive the SYN packet 510. In response, the second peer device may generate and send a SYN-ACK packet 512. In the context of FIG. 4, the second peer device 502 may set, in the SYN-ACK packet 512, the source port field 410 to the destination port of the SYN packet 510 and the destination port field 412 to the source port of the SYN packet 510. The second peer device 502 may set the ACK number field 416 to the value indicated in the SN field 414 of the SYN packet 510 plus one. The second peer device 502 may select (e.g., randomly) a second SN and may set the SN field 414 of the SYN-ACK packet 512 to the second SN.

The first peer device 504 may receive the SYN-ACK packet 512. Responsively, the first peer device 504 may generate and send a ACK packet 514. In the context of FIG. 4, the first peer device 504 may set the ACK number 416 of the ACK packet 514 to the second SN plus one.

After the exchange of the packets 510, 512, 514 of the connection establishment phase 506, a connection may be established. In various aspects, the connection may be bidirectional. A bidirectional connection may be configured to carry data in a payload 404 of a packet 400 both from the first peer device 504 to the second peer device 502 and from the second peer device 502 to the first peer device 504. Accordingly, when the first peer device 504 sends data in a payload of a packet, the first peer device 504 may set the SN in correspondence with the data bytes in the payload (e.g., the first peer device 504 may set the SN field 414 indicate the accumulated data bytes sent over the connection, including the data bytes in the payload 404 of the packet 400 sent by the first peer device 504 to the second peer device 502). Similarly, when the second peer device 502 sends data in a payload of a packet, the second peer device 502 may set the SN in correspondence with the data bytes in the payload (e.g., the second peer device 502 may set the SN field 414 indicate the accumulated data bytes sent over the connection, including the data bytes in the payload 404 of the packet sent by the second peer device 502 to the first peer device 504).

During the data communication phase 508, the first peer device 504 and the second peer device 502 may send data and acknowledge received data. For example, the second peer device 502 may send a downlink packet A 520a that includes data in a payload. In the context of FIG. 4, the second peer device 502 may send the downlink packet A 520a to include data in the payload 404. The second peer device 502 may indicate the SN corresponding to accumulated data bytes sent through the established connection. For example, for the downlink packet A 520a having data in a payload 404, the second peer device 502 may set the SN field 414 to the second SN (e.g., randomly selected SN during the connection establishment phase 506) plus the number of data bytes included in the payload 404 of the downlink packet A.

The first peer device 504 may receive the downlink packet A 520a. In response, the first peer device 504 may generate and send an uplink packet A 522a. The first peer device 504 may set the ACK flag 422 of the uplink packet A 522a in order to indicate that the uplink packet A 522a includes acknowledgement information. If the first peer device 504 acknowledges the data included in the payload 404 of the downlink packet A 520a, the first peer device 504 may set the ACK number field 416 of the uplink packet A 522a to the SN indicated by the SN number field 414 of the downlink packet A 520a plus the payload length of the downlink packet A 520a plus one.

In one aspect, the first peer device 504 may refrain from including data in the payload 404 of the uplink packet A 522a. In such an aspect, the first peer device 504 may set the SN number field 414 to indicate the first SN (e.g., a randomly selected SN included in the SYN packet 510), because the first peer device 504 is not sending data and therefore no additional data bytes have accumulated with which to increase the SN. In some aspects, the uplink packet A 522a may be known as a "pure ACK" because the uplink packet A 522a includes acknowledgement information, but does not include data in the payload 404.

In some aspects, second peer device 502 may generate and send a downlink packet B 520b. The second peer device 502 may send the downlink packet B 520b to include data in the payload 404. The second peer device 502 may indicate the SN corresponding to accumulated data bytes sent through the established connection. For example, for the downlink packet B 520b having data in a payload 404, the second peer device 502 may set the SN field 414 to the SN of the downlink packet A 520a plus the data bytes included in the payload 404 of the downlink packet A 520a.

Similar to the operations described with respect to reception of the downlink packet A 520a, supra, the first peer device 504 may receive the downlink packet B 520b. In response, the first peer device 504 may generate and send an uplink packet B 522b. The first peer device 504 may set the ACK flag 422 of the uplink packet B 522b in order to indicate that the uplink packet B 522b includes acknowledgement information. If the first peer device 504 acknowledges the data included in the payload 404 of the downlink packet B 520b, the first peer device 504 may set the ACK number field 416 of the uplink packet B 522b to the SN indicated by the SN number field 414 of the downlink packet B 520b plus the payload length of the downlink packet B 520b plus one.

Because the connection may be bidirectional, the first peer device 504 may include data in the payload 404 of the uplink packet B 522b. In such an aspect, the first peer device 504 may set the SN number field 414 to indicate the accumulated data bytes included in the payload 404 of the uplink packet B 522b plus the first SN (e.g., a randomly selected SN included in the SYN packet 510). In some aspects, the uplink packet B 522b may be known as a "piggybacked ACK" because the uplink packet B 522b includes acknowledgement information in addition to data in the payload 404.

The first peer device 504 and the second peer device 502 may continue to communicate through the bidirectional connection in a manner similar to that described herein, supra. When the communication has concluded, the first peer device 504 and the second peer device 502 may close or terminate the connection.

Figure 6:
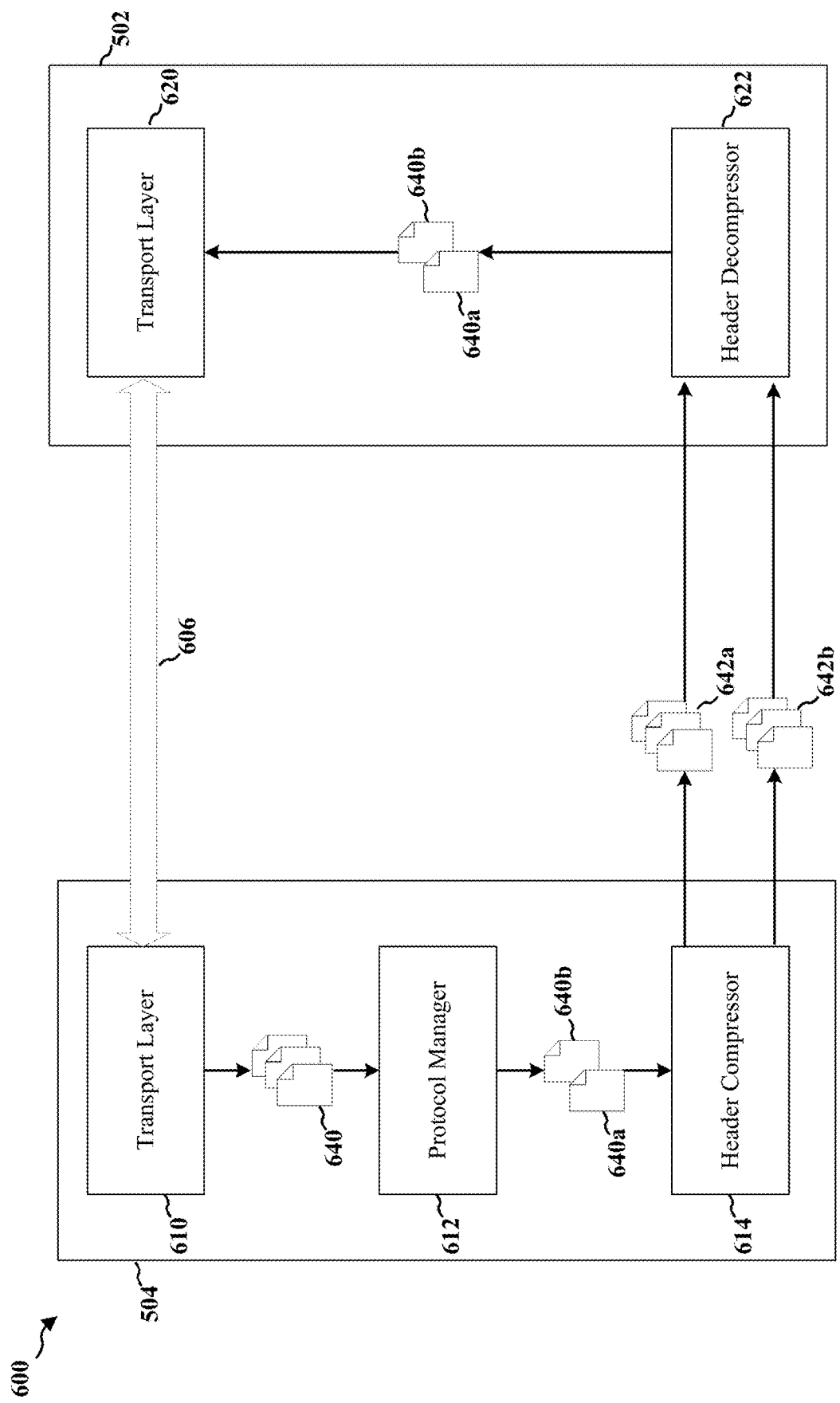
FIG. 6 is a block diagram illustrating an example of a wireless communications system.

FIG. 6 is a block diagram illustrating a wireless communications system 600. The wireless communications system 600 may include a first peer device 504 and a second peer device 502. As illustrated, the first peer device 504 may include, for example, a transport layer 610. The transport layer 610 may implement a packet communication protocol, such as TCP. For example, the transport layer 610 may package data received from a higher layer (e.g., application layer) in one or more packets for communication over a connection. The transport layer 610 may be a component of a protocol stack or network stack. In some aspects, the transport layer 610 may be associated with a Layer 4 of a protocol or network stack.

In various aspects, the transport layer 610 may establish at least one connection 606 with a transport layer 620 of the second peer device 502. In various aspects, the at least one connection 606 may be bidirectional. In one aspect, the at least one connection 606 may include two connections, at least one of which may be bidirectional (although both connections of the at least one connection 606 may be bidirectional). In some aspects, a first connection of the at least one connection 606 may be a downlink connection, and a second connection of the at least one connection 606 may be an uplink connection.

The first peer device 504 may further include a protocol manager 612. The protocol manager 612 may be implemented in a same or lower layer than the transport layer 610. For example, the protocol manager 612 may be included in a link layer and/or Layer 2 of the protocol or network stack.

The first peer device 504 may further include an header compressor 614. The header compressor 614 may be configured to compress headers of packets based on the header compression protocol. For example, the header compression protocol may be ROHC. According to such an example, the header compressor 614 may be configured with ROHC profile 6 (e.g., ROHC profile 0x6) for compression of packet headers, or the header compressor 614 may be configured with ROHC profile 0 (e.g., ROHC profile 0x0 or 0x0000) in order to refrain from compression of packet headers.

The header compressor 614 may be included at a same or lower layer of the protocol or network stack as the protocol manager 612. For example, the header compressor 614 may be included in a link layer and/or Layer 2. In another example, the header compressor 614 may be included in a PHY layer and/or Layer 1.

Complementary to the header compressor 614, the second peer device 502 may include an header decompressor 622. The header decompressor may be configured to decompress headers of packets that are compressed based on the header compression protocol. For example, the header compression protocol may be ROHC. In such an example, the header decompressor 622 may be configured with ROHC profile 6 for decompression of packet headers, or the header decompressor 622 may be configured with ROHC profile 0 in order to refrain from decompression of headers (e.g., when the header compressor 614 refrains from compression).

The header decompressor 622 may be included at a layer of a protocol or network stack of the second peer device 502. For example, the header decompressor 622 may be included in a link layer and/or Layer 2. In another example, the header decompressor 622 may be included in a PHY layer and/or Layer 1.

The header decompressor 622 may provide decompressed packets to higher layers of the second peer device 502. For example, the header decompressor 622 may provide uncompressed packets to a transport layer 620 of the second peer device 502. The transport layer 620 of the second peer device 502 may implement the packet communication protocol, and may be associated with a Layer 4 of a protocol or network stack of the second peer device 502.

The header compressor 614 and the header decompressor 622 may operate according to the header compression protocol. According to an example of the header compression protocol, when the first peer device 504 and the second peer device 502 establish a connection, the first peer device 504 may send at least one uncompressed packet to the second peer device 502. When the first peer device 504 sends and the second peer device 502 receives the uncompressed packet, each of the header compressor 614 and header decompressor 622 may extract the initial header information indicated in the header of the uncompressed packet and store that initial header information. After the initial header information is stored, the header compressor 614 may compress headers of packets so that only different header information is indicated.

In one aspect, the header compressor 614 may be configured to compress a header of one packet based on a difference from a header of a preceding packet—e.g., a preceding packet that was compressed and sent through the connection immediately before the one packet. In an example of such an aspect, the header compressor 614 may be configured as ROHC profile 6. The header compressor 614 may expect the protocol manager 612 to deliver packets in order.

Similarly, the header decompressor 622 may be configured to decompress the header of the one packet based on a difference from the header of the preceding packet—e.g., the preceding packet that was received through the connection immediately before the one packet and decompressed. In an example, the header decompressor 622 may be configured with ROHC profile 6. The header decompressor 622 may expect in order delivery of packets having compressed headers from the first peer device 504.

In order to identify packets for the connection 606, the header compressor 614 may identify map a context identifier (ID) (CID) to the connection 606. For example, the CID may be mapped to at least the source port and destination port that are associated with the connection 606. In various aspects, the CID may be further mapped to one or more of a protocol (e.g., TCP), a source address, and/or a destination address. The header compressor 614 may compress headers of packets and indicate, in each header, the CID. Correspondingly, the header decompressor 622 may map the CID to the connection 606. When the header decompressor 622 receives a packet having a compressed header indicating a new CID, the header decompressor 622 may establish the corresponding context for the connection 606.

In various aspects, the transport layer 610 of the first peer device 504 and the transport layer 620 of the second peer device may establish a connection 606. In various aspects, the connection 606 may be bidirectional. In the context of FIG. 5, the first peer device 504 may send a SYN packet 510 to the second peer device 502. The second peer device 502 may respond to the first peer device 504 with a SYN-ACK packet 512. To complete establishment of the connection 606, the first peer device 504 may respond to the second peer device 502 with a ACK packet 514.

In various aspects, the second peer device 502 may send a set of packets through the connection 606 to the first peer device 504. For example, the transport layer 620 of the second peer device 502 may send downlink packet A, B, C 520a, 520b, 520c to the transport layer 610 of the first peer device 504 through the connection 606.

In various aspects, the transport layer 610 may receive the downlink packet A, B, C 520a, 520b, 520c. The transport layer 610 may acknowledge the data carried in the respective payloads of the downlink packet A, B, C 520a, 520b, 520c. Accordingly, the transport layer 610 may generate the uplink packet A 522a to indicate ACK information corresponding to the downlink packet A 520a, may generate the uplink packet B 522b to indicate ACK information for the downlink packet B 520b, and may generate the uplink packet C to indicate the ACK information for the downlink packet C 520c.

According to an aspect, the uplink packets A, C 522a, 522c may be generated to have empty payloads (e.g., the uplink packets A, C 522a, 522c may be "pure ACKs"). However, the uplink packet B 522b may be generated to include data in a payload, in addition to the ACK information for the downlink packet B 520b (e.g., the uplink packet B 522b may be a "piggybacked ACK"). The transport layer 610 may provide the uplink packets A, B, C 522a, 522b, 522c to the protocol manager 612.

In various aspects, the protocol manager 612 may be configured to determine whether the connection 606 is bidirectional. For example, the protocol manager 612 may be configured to determine whether the transport layer 610 of the first peer device 504 is sending data (in addition to ACK information) through the connection 606 to the second peer device 502. In other words, the protocol manager 612 may be configured to determine if at least one of the uplink packets A, B, C 522a, 522b, 522c include data in a respective payload.

In one aspect, the protocol manager 612 may be configured to determine whether the connection 606 is bidirectional by comparing SNs of packets having empty payloads (e.g., SNs of "pure ACKs"). For example, the protocol manager 612 may obtain, from the transport layer 610, the uplink packets A, B, C 522a, 522b, 522c. The protocol manager 612 may identify a first SN indicated in the SN number field (e.g., the SN number field 414) of the uplink packet A 522a, and may be configured to identify a second SN indicated in the SN number field of the uplink packet C 522c. In other words, the protocol manager 612 may be configured to compare at least two SNs of at least two different pure ACK packets.

The protocol manager 612 may compare the first SN to the second SN. As described, supra, the SN number may not be changed when packets do not carry data in payloads, e.g., because no data bytes are included in the payload with which to increment the SN. Correspondingly, the SN number may be changed when packets do carry data in payloads, e.g., because additional data bytes have accumulated through the connection 606.

Because the uplink packet B 522*b* may carry data in a payload, the SN number of uplink packets B, C 522*b*, 522*c* may be different than the SN number of the uplink packet A 522*a*. When the protocol manager 612 compares the first SN to the second SN, the protocol manager 612 may determine that the first SN and the second SN are different. This difference may indicate that the transport layer 610 of the first peer device 504 has sent data through the connection 606 to the transport layer 620 of the second peer device 502. Therefore, the protocol manager 612 may determine that the connection 606 is bidirectional based at least in part on the difference between the first SN and the second SN (and, potentially, based on whether the protocol manager 612 detects that data is received in payloads of packets from the second peer device 502).

In various aspects, the protocol manager 612 may be configured to prioritize packets based on ACK information. For example, the protocol manager 612 may be configured to prioritize sending packets having ACK information and having empty payloads over sending packets having ACK information and having data in payloads. These packets may include headers that are compressed or uncompressed. If header compression is used, one or more compressed "pure ACKs" may be sent prior to one or more compressed "piggyback ACKs" over the connection 606. An implementation may achieve such prioritization in various ways. For example, the protocol manager 612 may be configured to identify or separate packets having ACK information and empty payloads into a first set of packets and packets having ACK information and payloads including data into a second set of packets. As described herein, the "separation" of the two sets of packets (e.g., "pure ACKs" and "piggyback ACKs" refers to logical separation; an implementation need not physically separate the two sets of packets into two separate queues, buffers or other storage mechanisms. The protocol manager 612 may cause the first set of packets to be sent through the connection 606 before the second set of packets are sent through the connection 606.

Prioritization of packets having ACK information and empty payloads over packets having ACK information and including data in payloads may reduce latency, increase efficiency, and/or improve throughput of packets. In one aspect, prioritization may improve throughput on a first connection when a second connection may affect throughput of the first connection. In one example, a first connection may be associated with downlink, and a second connection may be associated with uplink. By prioritizing a first set packets that includes ACK information in header for the first connection over a second set of packets that include data in payloads for the second connection, the throughput of the first connection may be improved—e.g., because the first set of packets may avoid getting queued behind the second set of packets, which may be delayed when awaiting a grant for the second set of packets.

In various aspects, the protocol manager 612 may determine whether to prioritize sending the first set of packets over sending the second set of packets through the connection 606. For example, the protocol manager 612 may determine whether the connection 606 is bidirectional. When the protocol manager 612 determines that the connection 606 is bidirectional, the protocol manager 612 may determine that packets having ACK information and empty payloads are to be sent over the connection 606 before sending packets having ACK information and payloads including data.

The header compressor 614, however, may expect the protocol manager 612 to deliver packets in order. Correspondingly, the header decompressor 622 may expect to receive packets in order. As described, supra, the header compressor 614 may compress a header of one packet based on a difference between the header of the one packet and a header of a previous packet. Similarly, the header decompressor may decompress the header of the one packet based on the difference between the header of the one packet and the header of the previous packet. Consequently, the separating packets into the first set and the second set and prioritizing one over the other may cause out-of-order delivery of header-compressed packets, which may cause the header decompressor 622 to lose synchronization context with the header compressor 614. Therefore, the protocol manager 612 may be configured to address the out-of-order delivery of header-compressed packets when prioritizing the first set of packets over the second set of packets for the bidirectional connection 606.

In various aspects, the protocol manager 612 may determine whether to compress, based on the header compression protocol, each header of the first set of packets and each header of the second set of packets. For example, the protocol manager 612 may determine whether the connection 606 is bidirectional. When the connection 606 is determined to be bidirectional, the protocol manager 612 may determine whether to establish a new CID in order for the first set of packets and the second set of packets to be delivered in order with respect to a given context when the first set of packets are to be prioritized over the second set of packets.

When the protocol manager 612 determines that sending the first set of packets is to be prioritized over sending the second set of packets and when the protocol manager 612 determines to compress each header of the first and second sets of packets based on the header compression protocol, the protocol manager 612 may resolve the issue of in-order delivery for the header compressor 614 and the header decompressor 622. For example, the protocol manager 612 may cause the a new, additional CID to be established by the header compressor 614. Accordingly, the header compressor 614 may be configured with an additional CID that is associated with the connection 606. In other words, an original CID may be established for the connection 606, and a new CID may also be established for the connection 606. Therefore, two contexts having different CIDs may be associated with the connection 606. For example, the new CID and the original CID may both be associated with at least one of a same source address, a same destination address, a same source port, or a same destination port of the connection 606. With the new CID and the original CID, the first and second sets of packets may be delivered in order to the header compressor 614 with respect to the new CID and the original CID.

In various aspects, the transport layer 610 of the first peer device 504 may receive the downlink packets D, E, F, G 520*d*, 520*e*, 520*f*, 520*g* from the transport layer 620 of the second peer device 502. In response, the transport layer 610 may include, in respective headers of uplink packets D, F 522*d*, 522*f*, ACK information respectively corresponding to data in payloads of the downlink packets D 520*d*, 520*f*. The transport layer 610 may further include data in payloads of uplink packets D, F 522*d*, 522*f*. Further, the transport layer 610 may include, in respective headers of uplink packets E, G 522*e*, 522*g*, ACK information corresponding to the data in payloads of downlink packets E, G 520*e*, 520*g*. However, the payloads of the uplink packets E, G 522*e*, 522*g* may be empty. The transport layer 610 may provide the set of uplink packets 640 to the protocol manager 612.

When the protocol manager 612 determines to prioritize pure ACK packets over piggybacked ACK packets, the protocol manager 612 may separate the pure ACK packets (e.g., uplink packets E, G 522e, 522g) from the piggybacked packets (e.g., uplink packets D, F 522d, 522f). In one aspect, the protocol manager 612 may inspect a payload of each packet included in the set of uplink packets 640. For example, the protocol manager 612 may perform deep packet inspection of the uplink packets D, E, F, G 522d, 522e, 522f, 522g in order to detect whether a respective payload includes data or is empty.

The protocol manager 612 may inspect the payload of the uplink packets D, F 522d, 522f in order to detect that the uplink packets D, F 522d, 522f include data in respective payloads. Accordingly, the protocol manager 612 may assign the uplink packets D, F 522d, 522f to a second set of packets 640b. Similarly, the protocol manager 612 may inspect the respective payloads of the uplink packets E, G 522e, 522g in order to detect that the uplink packets E, G 522e, 522g include respective payloads that are empty. Therefore, the protocol manager 612 may assign the uplink packets E, G 522e, 522g to the first set of packets 640a.

Because the protocol manager 612 has caused the header compressor 614 to establish two CIDs associated with the connection 606, each set of packets may be provided to the header compressor 614 in order with respect to a CID. For example, the protocol manager 612 may provide the first set of packets 640a and the second set of packets 640b in the sequential order in which the packets 640 are obtained from the transport layer 610. In aspects, the protocol manager 612 may provide the first set of packets 640a, in order, to the header compressor 614 in association with the new CID, and the protocol manager 612 may provide the second set of packets 640b, in order, to the header compressor 614 in association with the original CID. Therefore, the first set of packets 640a may be delivered in order for compression based on the header compression protocol using the new CID, and the second set of packets 640b may be delivered in order for compression based on the header compression protocol using the original CID.

In various aspects, the protocol manager 612 may provide the first set of packets 640a, in order, to the header compressor 614 before providing the second set of packets 640b, in order, to the header compressor 614. Therefore, the first set of packets 640a may be queued for sending through the connection 606 before the second set of packets 640b. In another example, the protocol manager 612 may inspect the incoming stream of packets 640 and identify the first set of packets 640a and the second set of packet 640b without changing the order of packets in the stream of packets 640. However, the protocol manager 612 may cause the header compressor 614 to use one CID for the first set of packets 640a and another CID for the second set of packets 640b. After the header compression, the compressed first set of packet 642a may be sent prior to the compressed second set of packets 642b. Since compressed packets associated with the same CID are still delivered in order, the header decompressor 622 may properly recover the compressed headers of these packets, even though header compressed packets of a CID may be sent "out-of-order" with respect to those of a different CID.

The header compressor 614 may compress the headers of the first set of packets 640a based on the header compression protocol using the new CID. For example, a header of the uplink packet G 522g may be compressed by the header compressor 614 with respect to the header of the uplink packet E 522e. The header compressor 614 may indicate the new CID in the compressed header of the uplink packet G 522g. The header compressor 614 may then deliver the compressed first set of packets 642a to be queued for sending.

Further, the header compressor 614 may compress the headers of the second set of packets 640a based on the header compression protocol using the original CID. For example, a header of the uplink packet F 522f may be compressed by the header compressor 614 with respect to the header of the uplink packet D 522d. The header compressor 614 may indicate the original CID in the compressed header of the uplink packet F 522f. The header compressor 614 may then deliver the compressed second set of packets 642b to be queued for sending, and the compressed second set of packets 642b may be queued for sending after the compressed first set of packets 642a.

The compressed first set of packets 642a may then be sent through the connection 606 to the second peer device 502. The header decompressor 622 may decompress the headers of the compressed first set of packets 642a in order to obtain the uncompressed first set of packets 640a. Because the compressed first set of packets 642a each indicate the new CID, the header decompressor 622 may receive and decompress the compressed first set of packets with respect to the new CID (e.g., the new context associated with the connection 606). The header decompressor 622 may deliver the uncompressed first set of packets 640a to the transport layer 620 of the second peer device 502.

After sending the compressed first set of packets 642a, the compressed second set of packets 642b may be sent through the connection 606 to the second peer device 502. The header decompressor 622 may decompress the headers of the compressed second set of packets 642b in order to obtain the uncompressed second set of packets 640b. Because the compressed second set of packets 642b each indicate the original CID, the header decompressor 622 may receive and decompress the compressed second set of packets 642b with respect to the original CID (e.g., the original context associated with the connection 606). The header decompressor 622 may deliver the uncompressed second set of packets 640b to the transport layer 620 of the second peer device 502.

While the illustrative aspects of FIG. 6 describes prioritization of packets occurring before compression by the header compressor 614, the present disclosure comprehends aspects in which compression by the header compressor 614 occurs before prioritization of the packets. In one aspect, as indicated herein, the protocol manager 612 may "flag" or otherwise indicate that "pure ACK" packets are to be prioritized over "piggybacked ACK" packets before header compression, and then the set of packets 640 may be separated into the first set of packets 642a and the second set of packets 642b. In another aspect, packet inspection (e.g., by the protocol manager 612) may occur after header compression by the header compressor 614, and prioritization of "pure ACK" packets over "piggybacked ACK" packets may likewise occur after header compression.

The transport layer 620 of the second peer device 502 may obtain the uncompressed first and second sets of packets 640a, 640b. The uncompressed first and second sets of packets 640a, 640b may be delivered out of order—e.g., the uplink packets E, G 522e, 522g may be delivered to the transport layer 620 before the uplink packets D, F 522d, 522f. However, the transport layer 620 may be configured to reorder packets. For example, the transport layer 620 may reorder the obtain first and second sets of packets 640a, 640b so that the uplink packets are in order as uplink packets D, E, F, G 522*d*, 522*e*, 522*f*, 522*g*.

In one aspect, the protocol manager 612 may determine to prioritize the pure ACK packets over the piggybacked ACK packets. However, the protocol manager 612 may determine that the bidirectional connection(s) 606 to be uncompressed. That is, the protocol manager 612 may determine whether the connection(s) 606 is to carry headers of packets that are uncompressed and, therefore, the protocol manager 612 may determine that packets are to be uncompressed. By refraining from compression, the first set of packets 640*a* and the second set of packets 640*b* may be sent to the second peer device 502 without ordering (e.g., establishing a new CID) for the header compressor—e.g., because compression based on the header compression protocol may be avoided. In such an aspect, the protocol manager 612 may refrain from compression of the headers of the first set of packets 640*a* based on the header compression protocol, and refrain from compression of the headers of the second set of packets 640*b* based on the header compression protocol. The first set of packets 640*a* may be sent through the connection 606 before the second set of packets 640*b* are sent through the connection 606. The transport layer 620 may then reorder the first and second sets of packets 640*a*, 640*b* so that the uplink packets are in order as uplink packets D, E, F, G 522*d*, 522*e*, 522*f*, 522*g*.

In one aspect, the protocol manager 612 may determine not to prioritize the pure ACK packets over the piggybacked ACK packets. However, the protocol manager 612 may determine that the packets are to be compressed. By refraining from prioritization, all packets may be delivered to the header compressor 614 and header decompressor 622 in order. In such an aspect, the protocol manager 612 may refrain from prioritizing the uplink packets D, E, F, G 522*d*, 522*e*, 522*f*, 522*g*. Therefore, the protocol manager 612 may provide the set of uplink packets 640 to the header compressor 614 in order, e.g., as uplink packets D, E, F, G 522*d*, 522*e*, 522*f*, 522*g*.

Accordingly, the header compressor 614 may compress headers of the set of packets 640. For example, the header of uplink packet 522*g* may be compressed with respect to the header of the uplink packet 522*f*, and so forth. The header compressor 614 may indicate, in each compressed header, the original CID (e.g., because only one context is established for the connection 606). The set of packets 640 may then be sent in order through the connection 606. The header decompressor 622 may receive the in-order set of compressed packets (e.g., uplink packets D, E, F, G 522*d*, 522*e*, 522*f*, 522*g*), and may decompress those packets in order to be provided to the transport layer 620.

Referring to FIGS. 7A, 7B, 7C, and 8, flowcharts illustrate aspects of methods 700, 800 for prioritization of packets indicating ACK information when packet headers may be compressed based on a header compression protocol, such as ROHC. The methods 700, 800 may be performed by, for example, a UE 104 of FIG. 1, a UE 350 of FIG. 3, a first peer device 504 of FIGS. 5 and 6, the apparatus 902/902' of FIGS. 9 and 10, and/or another wireless communications device. In an aspect, the methods 700, 800 may be performed by one or more components of a device, such as the protocol manager 612 of FIG. 6 and/or the components 904, 906, 908, 910, 912 of FIGS. 9 and 10. In various aspects, one or more operations may be optional. In various aspects, one or more operations may be contemporaneously performed and/or transposed.

Figure 7A:
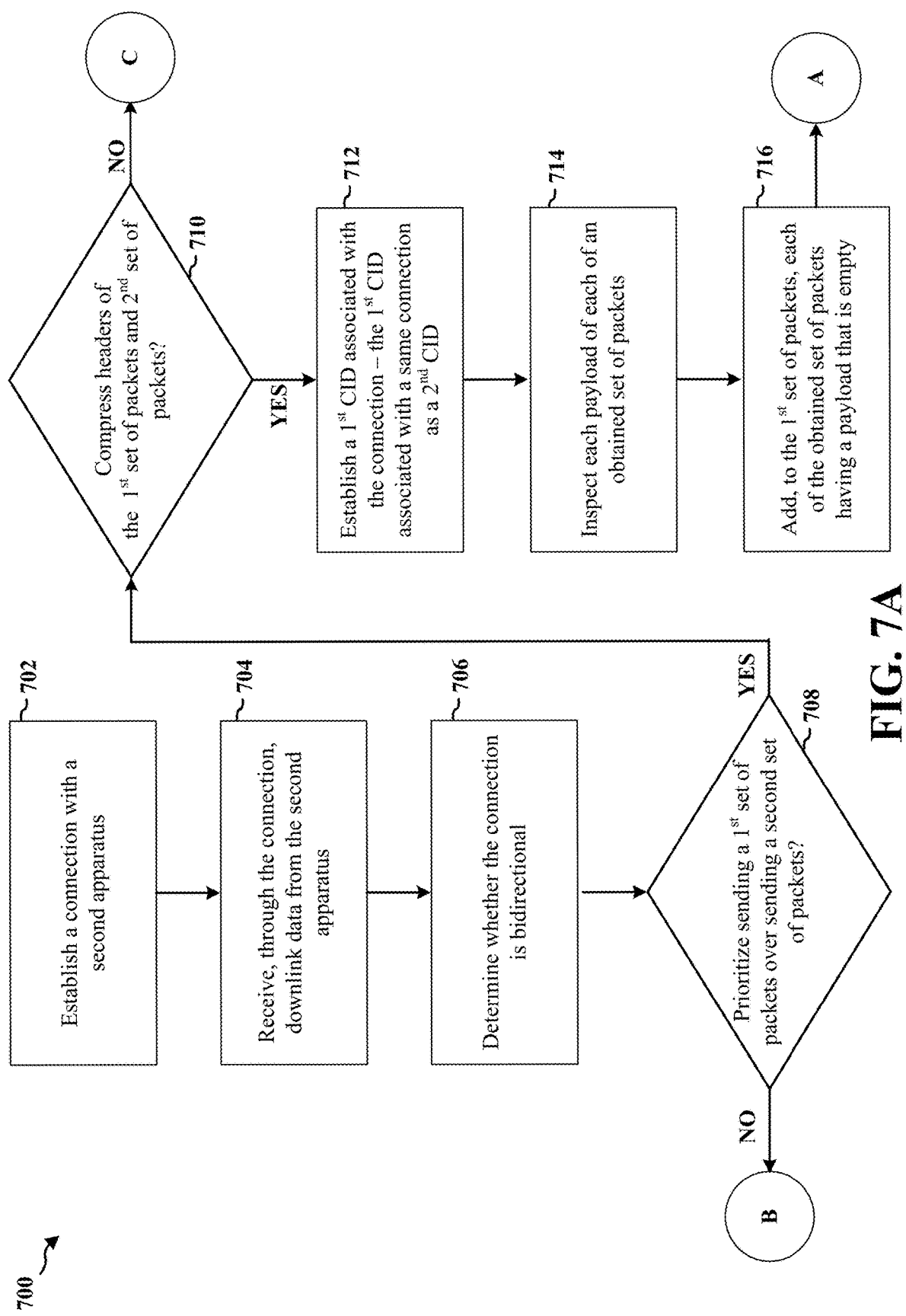
FIGS. 7A, 7B, and 7C are flowcharts illustrating an example of a method of wireless communication.
Figure 7B:
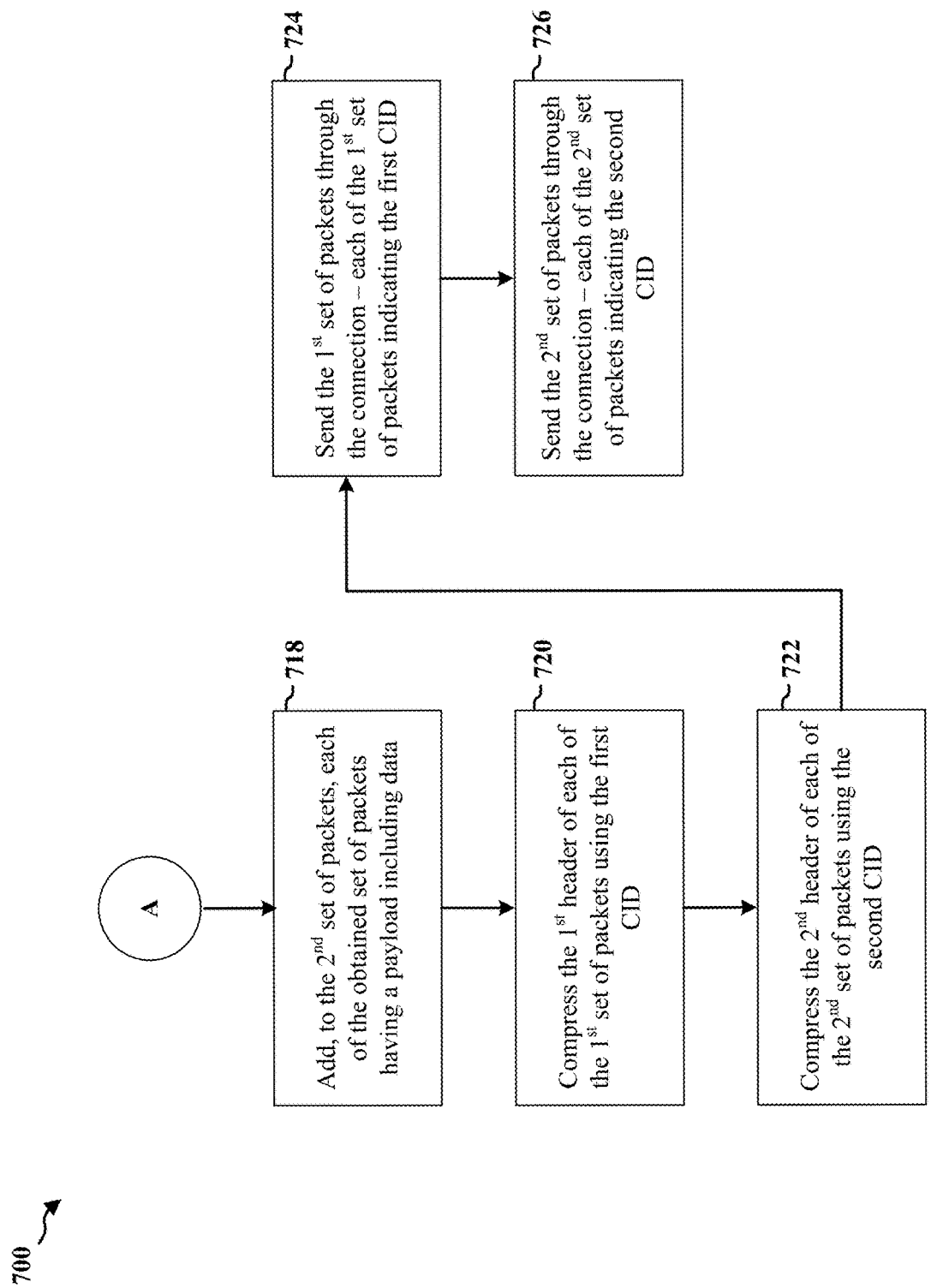
Figure 7C:
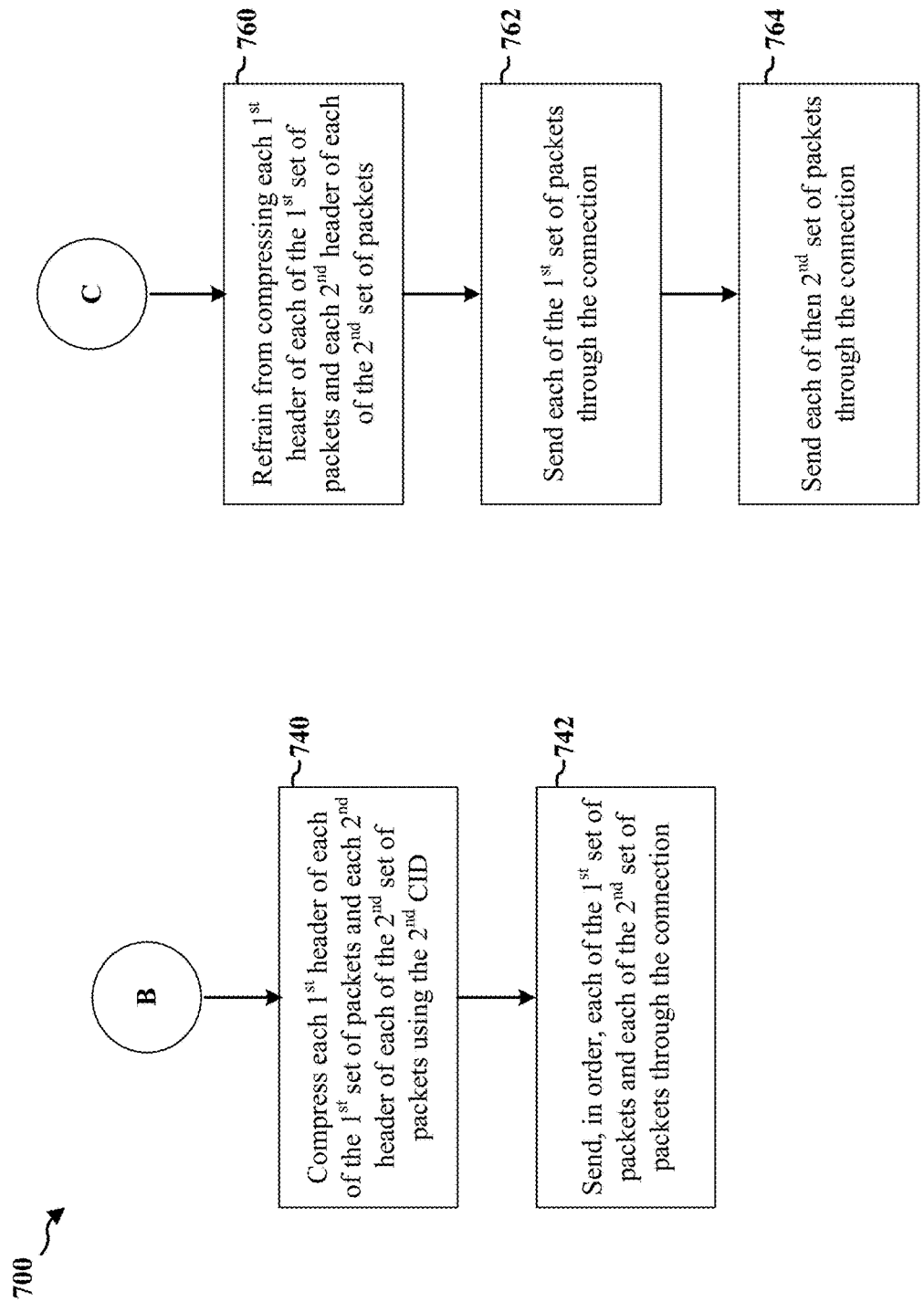

Beginning with the method 700 of FIG. 7A, at operation 702, a first peer device may establish a connection with a second apparatus. For example, the first peer device may send a SYN packet to a second peer device. Based on the SYN packet, the first peer device may receive, from the second peer device, a SYN-ACK packet. In response to the SYN-ACK packet, the first peer device may respond with a ACK packet, which may complete a three-way handshake for connection establishment.

In the context of FIGS. 4-6, the first peer device 504 may establish the connection 606 with the second peer device 502. For example, the first peer device 504 send, to the second peer device 502, the SYN packet 510. Based on the SYN packet 510, the first peer device 504 may receive the SYN-ACK packet 512 from the second peer device 502. In response, the first peer device 504 may send a ACK packet 514 to the second peer device 502, e.g., in order to complete the three-way handshake for establishment of the connection 606.

At operation 704, the first peer device may receive downlink data carried in payloads of packets through the established connection from the second peer device. In the context of FIGS. 4-6, the first peer device may receive the downlink packets A, B, C 520*a*, 520*b*, 520*c* through the connection 606 from the second peer device 502.

At operation 706, the first peer device may determine whether the connection is bidirectional. For example, the first peer device may determine whether packets sent by the first peer device include data in payloads, and may determine whether packets received by the first peer device include data in payloads. Further aspects may be described with respect to FIG. 8, infra. In the context of FIGS. 4-6, the protocol manager 612 of the first peer device 504 may determine whether the connection 606 is bidirectional.

At operation 708, the first peer device may determine whether to prioritize sending a first set of packets over sending a second set of packets. For example, the first peer device determine that both pure ACK packets and piggybacked ACK packets are sent over the connection, and then the first peer device may determine whether a new CID is to be established in order for pure ACK packets to be prioritized over piggybacked ACK packets when headers of packets may be compressed based on a header compression protocol.

In the context of FIGS. 4-6, the protocol manager 612 of the first peer device 504 may determine whether to prioritize sending the first set of packets 640*a* over sending the second set of packets 640*b*. For example, the protocol manager 612 may determine whether to prioritize sending the uplink packets E, G 522*e*, 522*g* over sending the uplink packets D, F 522*d*, 522*f*, e.g., because the uplink packets E, G 522*e*, 522*g* do not include data in payloads, whereas the uplink packets D, F 522*d*, 522*f* include data in payloads.

When the first peer device determines not to prioritize sending the first set of packets over sending the second set of packets, the method 700 may proceed to operation 740 and operation 742, described infra. When the first peer device determines to prioritize sending the first set of packets over sending the second set of packets, the method 700 may proceed to operation 710.

At operation 710, the first peer device may determine whether to compress headers of the first set of packets and headers of the second set of packets. In one example, the first peer device may determine whether the connection is to be compressed or uncompressed and, therefore, may determine whether to compress headers of the first and second sets of packets. For example, the first peer device may determine that both pure ACK packets and piggybacked ACK packets are sent over the connection, and then the first peer device may determine whether the first set of packets can be delivered in order to an header compressor and the second set of packets can be delivered in order to an header compressor. In the context of FIGS. 4-6, the protocol manager 612 may determine whether to compress headers of the first set of packets 640*a* (e.g., including the uplink packets E, G 522*e,* 522*g*) and headers of the second set of packets 640*b* (e.g., including the uplink packets D, F 522*d,* 522*f*).

When the first peer device determines not to compress headers of the first set of packets and the second set of packets, the method 700 may proceed to operation 760, operation 762, and operation 764, described infra. When the first peer device determines to compress headers of the first set of packets and the second set of packets, the method 700 may proceed to operation 712.

At operation 712, the first peer device may establish a first CID associated with the connection. For example, the first peer device may have a second CID associated with the connection, e.g., a header compressor may establish a context that is associated with the second CID for the connection. The first peer device may indicate, to the header compressor, that a new context is to be established for the connection. Therefore, the first peer device may cause, based on the indication, the header compressor to establish a new context associated with the first CID for the connection. Accordingly, the connection may be associated with two contexts, each context having a respective CID. In some aspects, both the first CID and the second CID may be at least partially mapped to a same source address, a same destination address, a same source port, and a same destination port of the connection.

In the context of FIGS. 4-6, the protocol manager 612 may cause the header compressor 614 to establish a new CID associated with the connection 606. In aspects, the header compressor 614 may have an original CID associated with the connection 606. Therefore, the protocol manager 612 may cause two different CDs to be associated with the one connection 606.

At operation 714, the first peer device may inspect each payload of each of a set of packets. The set of packets to be inspected may be obtained from a transport layer. For example, the first peer device may perform deep packet inspection of each of the set of packets, and the first peer device may determine whether each payload of each packet of the set of packets includes data. In the context of FIGS. 4-6, the protocol manager 612 may inspect each payload of each packet of a set of packets 640 obtained from the transport layer 610.

At operation 716, the first peer device may add, to a first set of packets, each packet of the set of packets that does not include data in a payload. For example, the first peer device may determine that a packet of the set of packets does not include data in a payload, and the first peer device may add that packet to the first set of packets. In one aspect, the first peer device may add a first descriptor to each packet of the first set of packets to indicate that each of the first set of packets is to be prioritized over each of the second set of packets. In the context of FIGS. 4-6, the protocol manager may add, to the first set of packets 640*a,* the uplink packets E, G 522*e,* 522*g* having ACK information in headers and having empty payloads.

At operation 718, the first peer device may add, to a second set of packets, each packet of the set of packets that includes data in a payload. For example, the first peer device may determine that a packet of the set of packets includes data in a payload, and the first peer device may add that packet to the second set of packets. In one aspect, the first peer device may add a second descriptor (or refrain from adding a descriptor) to each packet of the second set of packets to indicate that each of the second set of packets is not to be prioritized over each of the first set of packets. In the context of FIGS. 4-6, the protocol manager may add, to the second set of packets 640*b,* the uplink packets D, F 522*d,* 522*f* having ACK information in headers and having data in payloads.

With respect to operation 716 and operation 718, the "adding" of packets to one of the first set of packets or the second set of packets may refer to setting a flag or other indicator to at least one of the sets of packets in order to indicate priority with respect to other packets. For example, operation 716 may include setting a flag associated with each packet of the first set of packets to indicate that each packet of the first set of packets is to be prioritized over the second set of packets. Further to such an example, operation 718 may include setting a different flag or refraining from setting a flag associated with each packet of the second set of packets to indicate that each packet of the second set of packets is of a lower priority than that of the first set of packets (e.g., adding "pure ACK" packets to a first set and "piggyback ACK" packets to a second set may refer to logical separation. In other words, an aspect of operation 716 and 718 may not include physically adding packets to two different sets (e.g., two different queues, two different buffers or other storage mechanisms, two different data structures, etc.).

Furthermore, the first peer device may inspect an obtained packet stream (e.g., obtained from a transport layer of the first peer device), and the first peer device may identify the first set of packets and the second set of packet without changing the order of packets in the obtained packet stream before compression (see, e.g., operation 720 and operation 722). However, the first peer device may cause the header compressor to use the new CID for the first set of packets (e.g., "pure ACK" packets flagged to be prioritized over "piggyback ACK" packets). Correspondingly, the first peer device may cause the header compressor to use the original CID for the second set of packets (e.g., "piggybacked ACK" packets that are not flagged to be prioritized over "pure ACK" packets). After the header compression, the compressed first set of packets may be sent prior to the compressed second set of packets (see, e.g., operation 724 and operation 726, infra). Since the compressed first set of packets associated with the new CID is still delivered respectively in order and the compressed second set of packets associated with the original CID is still delivered respectively in order (although after delivery of the compressed first set of packets), an header decompressor at the second peer device may properly recover the compressed headers of these packets in order with respect to the new CID and in order with respect to the original CID (e.g., even though header-compressed packets associated with the new CID may be sent "out-of-order" with respect to those associated with the original CID).

At operation 720, the first peer device may compress the header of each of the first set of packets using the first CID. In aspects, each compressed header of each of the first set of packets may indicate the first CID. In one example, the first peer device may provide the first set of packets to an header compressor, and then the header compressor may compress each header of each of the first set of packets (e.g., with respect to a previous packet). In the context of FIGS. 4-6, the protocol manager 612 may provide the first set of packets 640*a* to the header compressor 614, and the header compressor 614 may compress the header of each of the first set of packets 640a. For example, the header compressor 614 may compress the header of the uplink packet G 522g with respect to the header of the uplink packet E 522e.

At operation 722, the first peer device may compress the header of each of the second set of packets using the second CID. In aspects, each compressed header of each of the second set of packets may indicate the second CID. In one example, the first peer device may provide the second set of packets to an header compressor, and then the header compressor may compress each header of each of the second set of packets (e.g., with respect to a previous packet). In the context of FIGS. 4-6, the protocol manager 612 may provide the second set of packets 640b to the header compressor 614, and the header compressor 614 may compress the header of each of the second set of packets 640b. For example, the header compressor 614 may compress the header of the uplink packet F 522f with respect to the header of the uplink packet D 522d.

At operation 724, the first peer device may send the first set of packets through the connection. In aspects, each compressed header of each of the first set of packets may indicate the first CID. In one example, the first peer device may queue the first set of packets, and then the first peer device may de-queue each of the first set of packets in order for sending through the connection. In the context of FIGS. 4-6, the first peer device 504 may send, through the connection 606, the first set of packets 642a having compressed headers.

At operation 726, the first peer device may send the second set of packets through the connection, after sending the first set of packets. In aspects, each compressed header of each of the second set of packets may indicate the second CID. In one example, the first peer device may queue the second set of packets after queuing the first set of packets, and then the first peer device may de-queue each of the second set of packets in order for sending through the connection, after de-queuing each of the first set of packets in order for sending through the connection. In the context of FIGS. 4-6, the first peer device 504 may send, through the connection 606, the second set of packets 642b having compressed headers.

Returning to operation 708, the first peer device may determine not to prioritize sending the first set of packets over sending the second set of packets. At operation 740, the first peer device may compress each header of each packet of the set of packets. For example, the first peer device may obtain the set of packets from a transport layer, and the first peer device may provide the set of packets in order to an header compressor. The header compressor may compress, in order, each header of each packet obtained from the transport layer. In the context of FIGS. 4-6, the header compressor 614 may obtain, from the transport layer 610, the set of packets 640. The header compressor 614 may compress, in order, each packet of the set of packets 640. For example, the header compressor 614 may compress, in order, the uplink packets D, E, F, G 522d, 522e, 522f, 522g.

At operation 742, the first peer device may send, in order, the set of packets. For example, the first peer device may queue, in in order, each packet having a compressed header of the set of packets, and the first peer device may then de-queue, in order, each packet of the set of packets for sending in order through the connection. In the context of FIGS. 4-6, the header compressor 614 may cause each of the set of packets to be queued for sending to the second peer device 602 through the connection 606. For example, the header compressor 614 may cause the uplink packet D 522d to be queued. The header compressor 614 may cause the uplink packet E 522e, having a header compressed with respect to the uplink packet D 522d, to be queued after the queueing of the uplink packet D 522d. The header compressor 614 may cause the uplink packet F 522F, having a header compressed with respect to the uplink packet E 522e, to be queued after the queueing of the uplink packet E 522e. The header compressor 614 may cause the uplink packet G 522g, having a header compressed with respect to the uplink packet F 522f, to be queued after the queueing of the uplink packet F 522f.

Returning to operation 710, the first peer device may determine not to compress headers of the first set of packets and the second set of packets, the method 700 may proceed to operation 760. At operation 760, the first peer device may refrain from compressing each header of each of the set of packets. For example, the first peer device may determine not to provide the first set of packets and the second set of packets to the header compressor, and the first peer device may instead provide the first set of packets to be queued for sending before the second set of packets. In the context of FIGS. 4-6, the protocol manager 612 may refrain from providing the first set of packets 640a and the second set of packets 640b to the header compressor 614.

At operation 762, the first peer device may send the first set of packets through the connection. For example, the first peer device may indicate that each packet of the first set of packets is to be queued for sending before each packet of the second set of packets. The first peer device may then cause the first set of packets to be queued before the second set of packets. In the context of FIGS. 4-6, the protocol manager 612 may send the first set of packets 640a through the connection 606 before sending the second set of packets 640b.

At operation 764, the first peer device may send the second set of packets through the connection. For example, the first peer device may indicate that each packet of the second set of packets is to be queued for sending after each packet of the first set of packets. The first peer device may then cause the second set of packets to be queued for sending though the connection after causing the first set of packets to be queued for sending through the connection. In the context of FIGS. 4-6, the protocol manager 612 may send the second set of packets 640b through the connection 606 after sending the first set of packets 640a.

Turning to FIG. 8, a flowchart illustrates a method 800 for determining whether a connection is bidirectional, as described with respect to operation 706, supra. At operation 802, the first peer device may identify a first SN associated with a third packet that includes a third header indicating ACK information and a third payload that is empty. For example, the first peer device may inspect a header of the third packet, and the first peer device may detect the first SN in an SN field of the header of the third packet. In the context of FIGS. 4-6, the protocol manager 612 may identify a first SN associated with the uplink packet A 522a.

At operation 804, the first peer device may identify a second SN associated with a fourth packet that includes a fourth header indicating ACK information and a fourth payload that is empty. For example, the first peer device may inspect a header of the fourth packet, and the first peer device may detect the second SN in an SN field of the header of the fourth packet. In the context of FIGS. 4-6, the protocol manager 612 may identify a second SN associated with the uplink packet C 522c.

At operation 806, the first peer device may compare the first SN to the second SN. For example, the first peer device may compare the first SN to the second SN, and the first peer device may determine whether the first SN is different from the second SN. When the first peer device determines that the first SN is different from the second SN, the first peer device may determine that the connection is bidirectional. When the first peer device determines that the first SN is the same as the second SN, the first peer device may determine that the connection is unidirectional. In the context of FIGS. 4-6, the protocol manager 612 may compare the first SN associated with the uplink packet A 522*a* to the second SN associated with the uplink packet C 522*c*.

Figure 9:
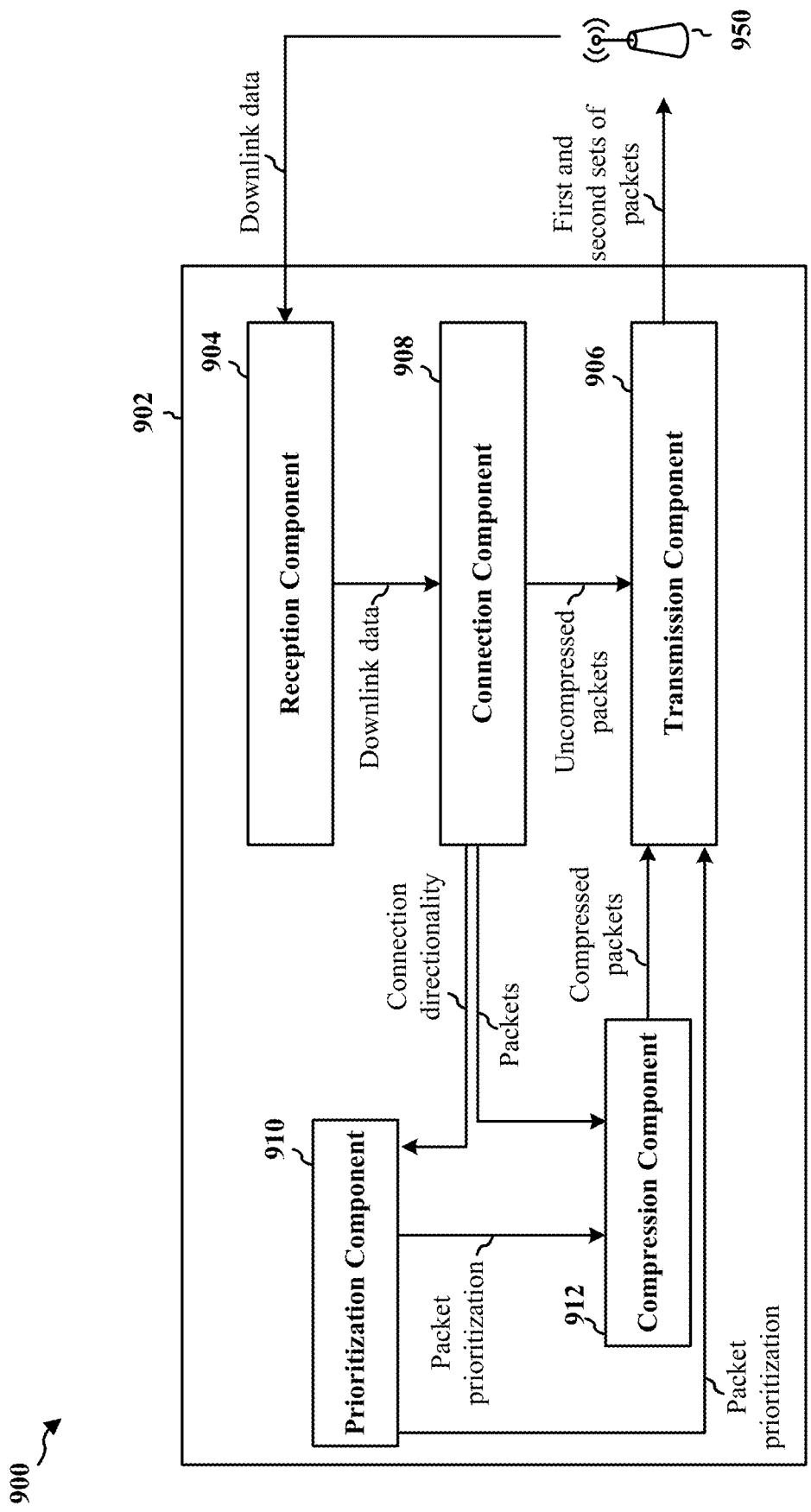
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus 902 may be a first peer device. For example, the apparatus 902 may be embodied in a UE 104 of FIG. 1, the UE 350 of FIG. 3, and/or the first peer device 504 of FIGS. 5-6. The apparatus 902 may communicate with a peer device 950. For example, the peer device 950 may be embodied in a base station 102/180 of FIG. 1, the base station 310 of FIG. 3, and/or the second peer device 502 of FIGS. 5-6.

The apparatus 902 may include a reception component 904 that is configured to receive signals (e.g., packets, downlink data, etc.) from the peer device 950. Further, the apparatus 902 may include a transmission component 906 that is configured to transmit signals (e.g., packets, uplink data, etc.) to the peer device 950.

The apparatus 902 may include a connection component 908. The connection component 908 may be configured to establish a connection with the peer device 950. The reception component 904 may receive downlink data from the peer device 950 through the established connection. The connection component 908 may be configured to generate ACK information based on the downlink data.

The connection component 908 may be configured to generate a first set of packets and a second set of packets. Each of the first set of packets may include a first header indicating first ACK information and may include a first payload that is empty. Each of the second set of packets may include a second header indicating second ACK information and may include a second payload including data.

According to various aspects, the connection component 908 may be configured to determine whether the connection is bidirectional. For example, the connection component 908 may identify a first SN associated with a third packet that includes a third header indicating third ACK information and includes a third payload that is empty. Further, the connection component 908 may identify a second SN associated with a fourth packet that includes a fourth header indicating fourth ACK information and includes a fourth payload that is empty. The connection component 908 may compare the first SN to the second SN, and the connection component 908 may determine that the connection is bidirectional when the first SN is different from the second SN.

The apparatus 902 may include a prioritization component 910. The prioritization component 910 may be configured to determine whether to prioritize sending the first set of packets over sending the second set of packets through the connection established with the peer device 950. In various aspects, the prioritization component 910 may determine whether to prioritize sending the first set of packets over sending the second set of packets through the connection established with the peer device 950 based on whether the connection is determined to be bidirectional. For example, when the connection component 908 determines that the connection is bidirectional, the prioritization component 910 may determine that sending the first set of packets is to be prioritized over sending the second set of packets through the connection.

In one configuration, when the prioritization component 910 determines that sending the first set of packets is to be prioritized over sending the second set of packets, the prioritization component 910 may obtain an unseparated and/or non-prioritized set of packets from the connection component 908. The prioritization component 910 may inspect each payload of each of the obtained set of packets for data. The prioritization component 910 may add, to the first set of packets, each of the obtained set of packets having a payload that is empty. Additionally, the prioritization component 910 may add, to the second set of packets, each of the obtained set of packets having a payload that includes data.

The prioritization component 910 may indicate the prioritization (if applicable) to the transmission component 906 and, potentially, to a compression component 912. Accordingly, the apparatus 902 may further include the compression component 912. The compression component 912 may be configured to determine whether to compress each first each of each of the first set of packets and each second header of each of the second set of packets. For example, the compression component 912 may determine whether to compress headers of packets based at least in part on whether the connection is determined to be bidirectional.

According to one configuration, the compression component 912 may determine that both pure ACK packets and piggybacked ACK packets are to be sent over the connection. The compression component 912 may determine whether the first set of packets are delivered in order to the compression component 912 and, further, whether the second set of packets are delivered in order to the compression component 912. For example, the connection component 908 may indicate, to the compression component 912, that the first set of packets are to be delivered in order to the compression component 912 and, further, the second set of packets are to be delivered in order to the compression component 912. When the compression component 912 is to receive the in-order first set of packets and in-order second set of packets, then the compression component 912 may determine that the headers of the first and second sets of packets are to be compressed.

The connection component 908 may establish at least one CID through the connection with the peer device 950. In one configuration, the connection component 908 may also establish another CID through the connection with the peer device 950. For example, when the prioritization component 910 determines that sending the first set of packets is to be prioritized over sending the second set of packets and, further, when the compression component 912 determines that each first header of each of the first set of packets and each second header of each of the second set of packets is to be compressed, then the connection component 908 may establish both a first CID and a second CID through the connection. The connection component 908 may establish the first CID to be mapped to a same source address, a same destination address, a same source port, and a same destination port of the connection to which the second CID is mapped. In some aspects, the compression component 912 may determine to compress headers of the first and second sets of packets when both the first and second CIDs are established, e.g., in order to deliver each of the first set of packets in association with the first CID and, further, to deliver each of the second set of packets in association with the second CID.

When the prioritization component 910 determines that sending the first set of packets is to be prioritized over sending the second set of packets and, further, when the compression component 912 determines that each first header of each of the first set of packets and each second header of each of the second set of packets is to be compressed, then the compression component 912 may compress the first header of each of the first set of packets using the first CID associated with the connection. In addition, the compression component 912 may compress the second header of each of the second set of packets using the second CID associated with the connection. The compression component 912 may provide the first and second sets of packets having the respectively compressed headers to the transmission component 906.

When the prioritization component 910 determines that sending the first set of packets is to be prioritized over sending the second set of packets and, further, when the compression component 912 determines that each first header of each of the first set of packets and each second header of each of the second set of packets is to be compressed, then the transmission component 906 may first send the first set of packets through the connection, and each of the first set of packets may indicate the first CID. Next, the transmission component 906 may send, after sending the first set of packets, the second set of packets through the connection, and each of the second set of packets may indicate the second CID.

According to another configuration, the prioritization component 910 may determine that sending the first set of packets is not to be prioritized over sending the second set of packets. The compression component 912, however, may determine that each of the headers of the first and second sets of packets are to be compressed, even without prioritization. Therefore, the compression component 912 may still compress each first header of each of the first set of packets and each second header of each of the second set of packets using the second CID.

The compression component 912 may provide the first and second sets of packets having the respectively compressed headers to the transmission component 906. The transmission component 906 may send, in order, each of the first set of packets and each of the second set of packets through the connection; however, each of the first set of packets and each of the second set of packets may indicate the second CID (e.g., the first CID may be unused and/or unestablished in such a configuration).

According to yet another configuration, the prioritization component 910 may determine that sending the first set of packets is to be prioritized over sending the second set of packets. The compression component 912, however, may determine that each of the headers of the first and second sets of packets are to be uncompressed, even with prioritization. In such a configuration, the compression component 912 may refrain from compressing, using the header compression protocol, each first header of each of the first set of packets and, further, the compression component 912 may refrain from compressing, using the header compression protocol, each second header of each of the second set of packets. According to this configuration, the transmission component 906 may send each of the first set of packets and, after sending each of the first set of packets, the transmission component 906 may send each of the second set of packets through the connection.

The apparatus may include additional components that perform each of the blocks of the algorithm in the aforementioned flowcharts of FIGS. 7A, 7B, 7C, and 8. As such, each block in the aforementioned flowcharts of FIGS. 7A, 7B, 7C, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
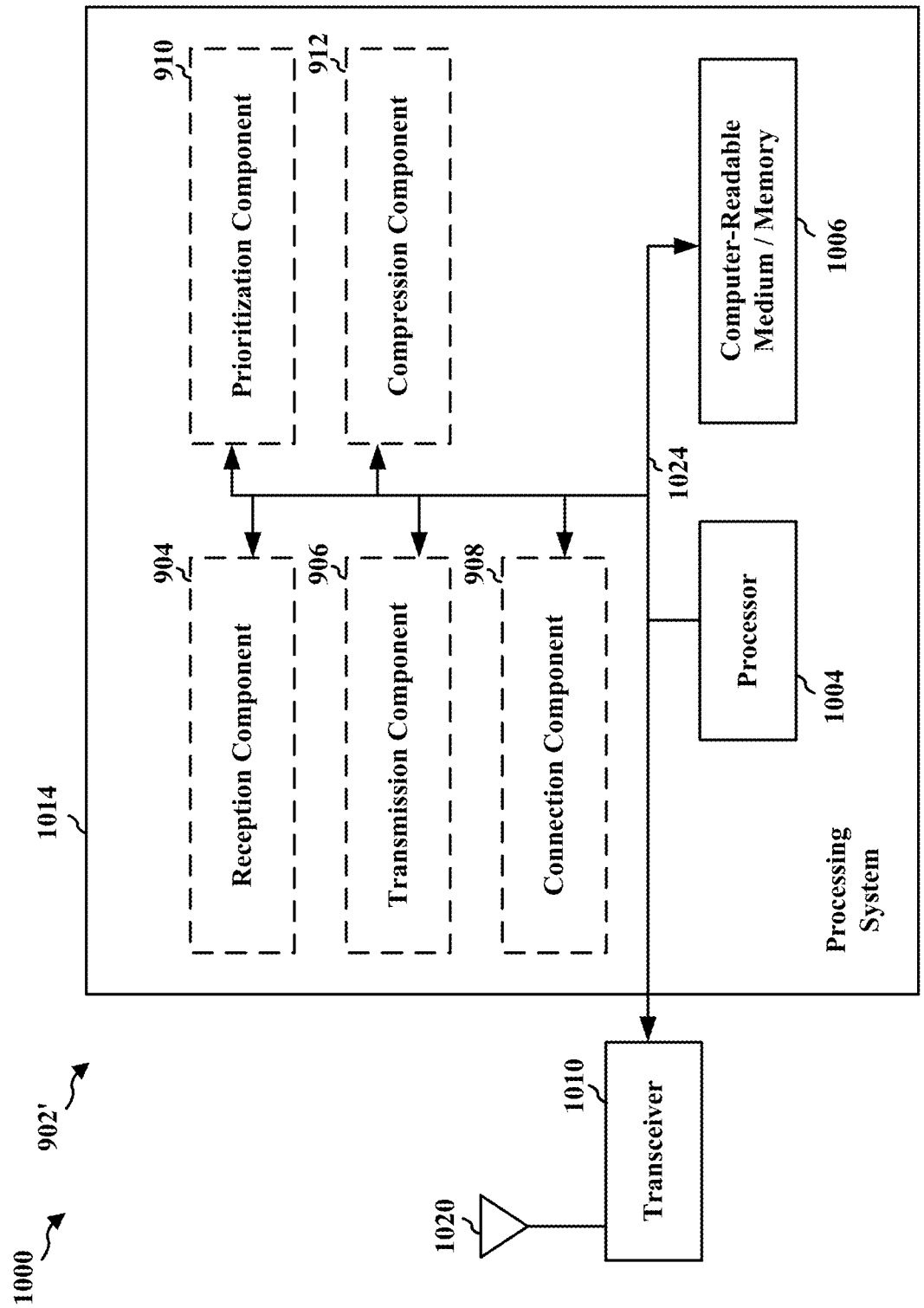
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining whether to prioritize sending a first set of packets over sending a second set of packets through a connection established with a second apparatus, each of the first set of packets having a first header indicating first ACK information and a first payload that is empty and each of the second set of packets having a second header indicating second ACK information and a second payload including data. The apparatus 902/902' includes means for determining whether to compress each first header of each of the first set of packets and each second header of each of the second set of packets. When the sending the first set of packets is determined to be prioritized over the sending the second set of packets, and when each first header of each of the first set of packets and each second header of each of the second set of packets is determined to be compressed, the apparatus 902/902' further includes means for compressing the first header of each of the first set of packets using a first CID associated with the connection; means for compressing the second header of each of the second set of packets using a second CID associated with the connection; means for sending the first set of packets through the connection, each of the first set of packets indicating the first CID; and means for sending, after the sending the first set of packets, the second set of packets through the connection, each of the second set of packets indicating the second CID.

According to one configuration, when the sending the first set of packets is determined not to be prioritized over the sending the second set of packets, and when each first header of each of the first set of packets and each second header of each of the second set of packets is determined to be compressed, the apparatus 902/902' further includes means for compressing each first header of each of the first set of packets and each second header of each of the second set of packets using the second CID; and means for sending, in order, each of the first set of packets and each of the second set of packets through the connection, each of the first set of packets and second set of packets indicating the second CID.

According to one configuration, when the sending the first set of packets is determined to be prioritized over the sending the second set of packets, and when each first header of each of the first set of packets and each second header of each of the second set of packets is determined to be uncompressed, the apparatus 902/902' further includes means for refraining from compressing, using the header compression protocol, each first header of each of the first set of packets and each second header of each of the second set of packets; means for sending each of the first set of packets to the second apparatus through the connection; and means for sending, after the sending each of the first set of packets, each of the second set of packets to the second apparatus through the connection.

The apparatus 902/902' may further include means for determining whether the connection is bidirectional, and the means for determining whether to prioritize sending the first set of packets over sending the second set of packets through the connection established with a second apparatus is configured for determining whether to prioritize sending the first set of packets over sending the second set of packets through the connection established with the second apparatus based on the connection being determined to be bidirectional.

In one configuration, the means for determining whether the connection is bidirectional is configured to identify a first SN associated with a third packet that includes a third header indicating third ACK information and includes a third payload that is empty; identify a second SN associated with a fourth packet that includes a fourth header indicating fourth ACK information and includes a fourth payload that is empty; and compare the first SN to the second SN. The means for determining whether the connection is bidirectional is configured to determine that the connection is bidirectional when the first SN is different from the second SN.

In one configuration, the apparatus 902/902' may further include means for establishing the first CID associated with the connection when the sending the first set of packets is determined to be prioritized over the sending the second set of packets and when each first header of each of the first set of packets and each second header of each of the second set of packets is determined to be compressed. The first CID may be established to be mapped to a same source address, a same destination address, a same source port, and a same destination port of the connection to which the second CID is mapped.

In one configuration, when the sending the first set of packets is determined to be prioritized over the sending the second set of packets, the apparatus 902/902' may further include means for inspecting each payload of each of an obtained set of packets for data; means for adding, to the first set of packets, each of the obtained set of packets having a payload that is empty; and means for adding, to the second set of packets, each of the obtained set of packets having a payload including data.

In one configuration, the apparatus 902/902' may further include means for establishing the connection with the second apparatus; and means for receiving, through the connection, downlink data from the second apparatus. In this configuration, the first ACK information and the second ACK information may be based on the downlink data.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first apparatus, the method comprising:
   determining whether to prioritize sending a first set of packets over sending a second set of packets through a connection established with a second apparatus, each of the first set of packets having a first header indicating first acknowledgement (ACK) information and a first payload that is empty and each of the second set of packets having a second header indicating second ACK information and a second payload including data; and
   determining whether to compress each first header of each of the first set of packets and each second header of each of the second set of packets; and
   when the sending the first set of packets is determined to be prioritized over the sending the second set of packets, and when each first header of each of the first set of packets and each second header of each of the second set of packets is determined to be compressed:
      compressing the first header of each of the first set of packets using a first context identifier (CID) associated with the connection;
      compressing the second header of each of the second set of packets using a second CID associated with the connection;
      sending the first set of packets through the connection, each of the first set of packets indicating the first CID; and
      sending, after the sending the first set of packets, the second set of packets through the connection, each of the second set of packets indicating the second CID.

2. The method of claim 1, further comprising, when the sending the first set of packets is determined not to be prioritized over the sending the second set of packets, and when each first header of each of the first set of packets and each second header of each of the second set of packets is determined to be compressed:
   compressing each first header of each of the first set of packets and each second header of each of the second set of packets using the second CID; and
   sending, in order, each of the first set of packets and each of the second set of packets through the connection, each of the first set of packets and second set of packets indicating the second CID.

3. The method of claim 1, further comprising, when the sending the first set of packets is determined to be prioritized over the sending the second set of packets, and when each first header of each of the first set of packets and each second header of each of the second set of packets is determined to be uncompressed:
   refraining from compressing each first header of each of the first set of packets and each second header of each of the second set of packets;
   sending each of the first set of packets to the second apparatus through the connection; and
   sending, after the sending each of the first set of packets, each of the second set of packets to the second apparatus through the connection.

4. The method of claim 1, further comprising:
   determining whether the connection is bidirectional,
   wherein the determining whether to prioritize sending the first set of packets over sending the second set of packets through the connection established with a second apparatus is based on the connection being determined to be bidirectional.

5. The method of claim 4, wherein the determining whether the connection is bidirectional comprises:
   identifying a first sequence number associated with a third packet that includes a third header indicating third ACK information and includes a third payload that is empty;
   identifying a second sequence number associated with a fourth packet that includes a fourth header indicating fourth ACK information and includes a fourth payload that is empty; and
   comparing the first sequence number to the second sequence number,
   wherein the connection is determined to be bidirectional when the first sequence number is different from the second sequence number.

6. The method of claim 1, further comprising:
   establishing the first CID associated with the connection when the sending the first set of packets is determined to be prioritized over the sending the second set of packets and when each first header of each of the first set of packets and each second header of each of the second set of packets is determined to be compressed.

7. The method of claim 6, wherein the first CID is established to be mapped to a same source address, a same destination address, a same source port, and a same destination port of the connection to which the second CID is mapped.

8. The method of claim 1, further comprising, when the sending the first set of packets is determined to be prioritized over the sending the second set of packets:
   inspecting each payload of each of an obtained set of packets for data;
   adding, to the first set of packets, each of the obtained set of packets having a payload that is empty; and
   adding, to the second set of packets, each of the obtained set of packets having a payload including data.

9. The method of claim 1, further comprising:
   establishing the connection with the second apparatus; and
   receiving, through the connection, downlink data from the second apparatus,
   wherein the first ACK information and the second ACK information is based on the downlink data.

10. A first apparatus configured for wireless communication, the first apparatus comprising:
    means for determining whether to prioritize sending a first set of packets over sending a second set of packets through a connection established with a second apparatus, each of the first set of packets having a first header indicating first acknowledgement (ACK) information and a first payload that is empty and each of the second set of packets having a second header indicating second ACK information and a second payload including data; and means for determining whether to compress each first header of each of the first set of packets and each second header of each of the second set of packets; and when the sending the first set of packets is determined to be prioritized over the sending the second set of packets, and when each first header of each of the first set of packets and each second header of each of the second set of packets is determined to be compressed, the first apparatus further comprises:

means for compressing the first header of each of the first set of packets using a first context identifier (CID) associated with the connection;

means for compressing the second header of each of the second set of packets using a second CID associated with the connection;

means for sending the first set of packets through the connection, each of the first set of packets indicating the first CID; and means for sending, after the sending the first set of packets, the second set of packets through the connection, each of the second set of packets indicating the second CID.

11. The first apparatus of claim 10, further comprising, when the sending the first set of packets is determined not to be prioritized over the sending the second set of packets, and when each first header of each of the first set of packets and each second header of each of the second set of packets is determined to be compressed, the first apparatus comprising:

means for compressing each first header of each of the first set of packets and each second header of each of the second set of packets using the second CID; and means for sending, in order, each of the first set of packets and each of the second set of packets through the connection, each of the first set of packets and second set of packets indicating the second CID.

12. The first apparatus of claim 10, further comprising, when the sending the first set of packets is determined to be prioritized over the sending the second set of packets, and when each first header of each of the first set of packets and each second header of each of the second set of packets is determined to be uncompressed:

means for refraining from compressing each first header of each of the first set of packets and each second header of each of the second set of packets;

means for sending each of the first set of packets to the second apparatus through the connection; and means for sending, after the sending each of the first set of packets, each of the second set of packets to the second apparatus through the connection.

13. The first apparatus of claim 10, further comprising:
means for determining whether the connection is bidirectional,
wherein the determining whether to prioritize sending the first set of packets over sending the second set of packets through the connection established with a second apparatus is based on the connection being determined to be bidirectional.

14. The first apparatus of claim 13, wherein the means for determining whether the connection is bidirectional is configured to:

identify a first sequence number associated with a third packet that includes a third header indicating third ACK information and includes a third payload that is empty;
identify a second sequence number associated with a fourth packet that includes a fourth header indicating fourth ACK information and includes a fourth payload that is empty; and compare the first sequence number to the second sequence number,
wherein the connection is determined to be bidirectional when the first sequence number is different from the second sequence number.

15. The first apparatus of claim 10, further comprising:
means for establishing the first CID associated with the connection when the sending the first set of packets is determined to be prioritized over the sending the second set of packets and when each first header of each of the first set of packets and each second header of each of the second set of packets is determined to be compressed.

16. The first apparatus of claim 15, wherein the first CID is established to be mapped to a same source address, a same destination address, a same source port, and a same destination port of the connection to which the second CID is mapped.

17. The first apparatus of claim 10, further comprising, when the sending the first set of packets is determined to be prioritized over the sending the second set of packets:

means for inspecting each payload of each of an obtained set of packets for data;
means for adding, to the first set of packets, each of the obtained set of packets having a payload that is empty; and
means for adding, to the second set of packets, each of the obtained set of packets having a payload including data.

18. The first apparatus of claim 10, further comprising:
means for establishing the connection with the second apparatus; and
means for receiving, through the connection, downlink data from the second apparatus,
wherein the first ACK information and the second ACK information is based on the downlink data.

19. A first apparatus configured for wireless communication, the first apparatus comprising:
a memory; and
at least one processor coupled to the memory and configured to:
determine whether to prioritize sending a first set of packets over sending a second set of packets through a connection established with a second apparatus, each of the first set of packets having a first header indicating first acknowledgement (ACK) information and a first payload that is empty and each of the second set of packets having a second header indicating second ACK information and a second payload including data; and
determine whether to compress each first header of each of the first set of packets and each second header of each of the second set of packets; and
when the sending the first set of packets is determined to be prioritized over the sending the second set of packets, and when each first header of each of the first set of packets and each second header of each of the second set of packets is determined to be compressed:
compress the first header of each of the first set of packets using a first context identifier (CID) associated with the connection;
compress the second header of each of the second set of packets using a second CID associated with the connection;

send the first set of packets through the connection, each of the first set of packets indicating the first CID; and send, after the sending the first set of packets, the second set of packets through the connection, each of the second set of packets indicating the second CID.

20. The first apparatus of claim 19, wherein when the sending the first set of packets is determined not to be prioritized over the sending the second set of packets, and when each first header of each of the first set of packets and each second header of each of the second set of packets is determined to be compressed, the at least one processor is further configured to:

compress each first header of each of the first set of packets and each second header of each of the second set of packets using the second CID; and send, in order, each of the first set of packets and each of the second set of packets through the connection, each of the first set of packets and second set of packets indicating the second CID.

21. The first apparatus of claim 19, wherein when the sending the first set of packets is determined to be prioritized over the sending the second set of packets, and when each first header of each of the first set of packets and each second header of each of the second set of packets is determined to be uncompressed, the at least one processor is further configured to:

refrain from compressing each first header of each of the first set of packets and each second header of each of the second set of packets;

send each of the first set of packets to the second apparatus through the connection; and send, after the sending each of the first set of packets, each of the second set of packets to the second apparatus through the connection.

22. The first apparatus of claim 19, wherein the at least one processor is further configured to:

determine whether the connection is bidirectional, wherein the determination whether to prioritize sending the first set of packets over sending the second set of packets through the connection established with a second apparatus is based on the connection being determined to be bidirectional.

23. The first apparatus of claim 22, wherein the determination whether the connection is bidirectional comprises to:

identify a first sequence number associated with a third packet that includes a third header indicating third ACK information and includes a third payload that is empty;

identify a second sequence number associated with a fourth packet that includes a fourth header indicating fourth ACK information and includes a fourth payload that is empty; and compare the first sequence number to the second sequence number, wherein the connection is determined to be bidirectional when the first sequence number is different from the second sequence number.

24. The first apparatus of claim 19, wherein the at least one processor is further configured to:

establish the first CID associated with the connection when the sending the first set of packets is determined to be prioritized over the sending the second set of packets and when each first header of each of the first set of packets and each second header of each of the second set of packets is determined to be compressed.

25. The first apparatus of claim 24, wherein the first CID is established to be mapped to a same source address, a same destination address, a same source port, and a same destination port of the connection to which the second CID is mapped.

26. The first apparatus of claim 19, wherein when the sending the first set of packets is determined to be prioritized over the sending the second set of packets, the at least one processor is further configured to:

inspect each payload of each of an obtained set of packets for data;

add, to the first set of packets, each of the obtained set of packets having a payload that is empty; and add, to the second set of packets, each of the obtained set of packets having a payload including data.

27. The first apparatus of claim 19, wherein the at least one processor is further configured to:

establish the connection with the second apparatus; and receive, through the connection, downlink data from the second apparatus, wherein the first ACK information and the second ACK information is based on the downlink data.

28. A computer-readable medium storing computer-executable code for wireless communication by a first apparatus, comprising code to:

determine whether to prioritize sending a first set of packets over sending a second set of packets through a connection established with a second apparatus, each of the first set of packets having a first header indicating first acknowledgement (ACK) information and a first payload that is empty and each of the second set of packets having a second header indicating second ACK information and a second payload including data; and determine whether to compress each first header of each of the first set of packets and each second header of each of the second set of packets; and when the sending the first set of packets is determined to be prioritized over the sending the second set of packets, and when each first header of each of the first set of packets and each second header of each of the second set of packets is determined to be compressed:

compress the first header of each of the first set of packets using a first context identifier (CID) associated with the connection;

compress the second header of each of the second set of packets using a second CID associated with the connection;

send the first set of packets through the connection, each of the first set of packets indicating the first CID; and send, after the sending the first set of packets, the second set of packets through the connection, each of the second set of packets indicating the second CID.

29. The computer-readable medium of claim 28, wherein when the sending the first set of packets is determined not to be prioritized over the sending the second set of packets, and when each first header of each of the first set of packets and each second header of each of the second set of packets is determined to be compressed, the computer-readable medium further comprises code to:

compress each first header of each of the first set of packets and each second header of each of the second set of packets using the second CID; and send, in order, each of the first set of packets and each of the second set of packets through the connection, each of the first set of packets and second set of packets indicating the second CID.

30. The computer-readable medium of claim 28, wherein when the sending the first set of packets is determined to be prioritized over the sending the second set of packets, and when each first header of each of the first set of packets and each second header of each of the second set of packets is determined to be uncompressed, the computer-readable medium further comprises code to:
- refrain from compressing each first header of each of the first set of packets and each second header of each of the second set of packets;
- send each of the first set of packets to the second apparatus through the connection; and
- send, after the sending each of the first set of packets, each of the second set of packets to the second apparatus through the connection.

* * * * *